United States Patent
Wang et al.

(10) Patent No.: US 12,041,481 B2
(45) Date of Patent: Jul. 16, 2024

(54) TSN-CELLULAR COMMUNICATION SYSTEM QoS MAPPING AND RAN OPTIMIZATION BASED ON TSN TRAFFIC PATTERN RELATED INFORMATION

(71) Applicant: Telefonaktiebolaget LM Ericsson (publ), Stockholm (SE)

(72) Inventors: Kun Wang, Solna (SE); Kefeng Kenny Zhang, Beijing (CN); Paul Schliwa-Bertling, Ljungsbro (SE); Joachim Sachs, Sollentuna (SE); Torsten Dudda, Wassenberg (DE); Marilet De Andrade Jardim, Kista (SE); János Harmatos, Budapest (HU); Dinand Roeland, Sollentuna (SE); Balázs Varga, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 70 days.

(21) Appl. No.: 17/422,496

(22) PCT Filed: Jan. 10, 2020

(86) PCT No.: PCT/IB2020/050181
§ 371 (c)(1),
(2) Date: Jul. 13, 2021

(87) PCT Pub. No.: WO2020/148616
PCT Pub. Date: Jul. 23, 2020

(65) Prior Publication Data
US 2022/0078662 A1  Mar. 10, 2022

Related U.S. Application Data

(60) Provisional application No. 62/792,430, filed on Jan. 15, 2019.

(51) Int. Cl.
H04W 28/02 (2009.01)
H04L 47/28 (2022.01)
H04W 28/24 (2009.01)

(52) U.S. Cl.
CPC ......... H04W 28/0268 (2013.01); H04L 47/28 (2013.01); H04W 28/24 (2013.01)

(58) Field of Classification Search
CPC ... H04W 28/0268; H04W 28/24; H04W 4/24; H04L 47/28; H04L 12/1407; H04L 47/20;
(Continued)

(56) References Cited

U.S. PATENT DOCUMENTS 9,332,579 B2  5/2016 Scherer et al.
11,088,962 B2  8/2021 Chen et al.
(Continued)

FOREIGN PATENT DOCUMENTS

CN  108366023 A  8/2018
CN  108809852 A  11/2018
(Continued)

OTHER PUBLICATIONS

Ericsson, "C3-182188: QoS parameter mapping in PCF," 3GPP TSG-CT WG3 Meeting #96, Apr. 16-20, 2018, Kunming, China, 8 pages.
(Continued)

Primary Examiner — Steven Hieu D Nguyen
(74) Attorney, Agent, or Firm — Withrow & Terranova, PLLC

(57) ABSTRACT

Systems and methods related to Time-Sensitive Networking (TSN)-cellular communication system Quality of Service (QoS) mapping are disclosed. In some embodiments, a method performed for operating a cellular communications system as a virtual TSN node in a TSN system comprises, at a TSN application function, receiving one or more TSN QoS
(Continued)

parameters for the virtual TSN node from a controller associated with the TSN system and providing the one or more TSN QoS parameters to a core network function in a core network of the cellular communications system. The method further comprises, at the core network function, receiving the one or more TSN QoS parameters, mapping them to one or more QoS policies and/or one or more rules in the cellular communications system, and applying the one or more QoS policies and/or the one or more rules in the cellular communications system.

10 Claims, 16 Drawing Sheets

(58) Field of Classification Search
CPC ..... H04L 47/24; H04L 65/1016; H04L 65/80; H04M 15/00; H04M 15/66; H04M 15/8016
See application file for complete search history.

(56) References Cited

U.S. PATENT DOCUMENTS

| | | |
|---|---|---|
| 2015/0373660 A1 | 12/2015 | Gunnarsson et al. |
| 2018/0184428 A1 | 6/2018 | Cariou et al. |
| 2018/0220356 A1 | 8/2018 | Tenny et al. |
| 2019/0297025 A1 | 9/2019 | Kobayashi et al. |
| 2019/0363843 A1 | 11/2019 | Gordaychik |
| 2020/0053678 A1 | 2/2020 | Moon et al. |
| 2020/0059829 A1 | 2/2020 | Joseph et al. |
| 2020/0137615 A1* | 4/2020 | Joseph ................. H04W 24/02 |
| 2020/0389405 A1 | 12/2020 | Mardmoeller et al. |
| 2021/0007160 A1 | 1/2021 | Sivasiva Ganesan et al. |
| 2021/0204172 A1 | 7/2021 | Rost et al. |
| 2021/0243641 A1 | 8/2021 | Gangakhedkar et al. |
| 2021/0306901 A1 | 9/2021 | Mannweiler et al. |
| 2022/0022088 A1* | 1/2022 | Gebert .............. H04W 28/0268 |
| 2022/0224651 A1 | 7/2022 | Rost et al. |

FOREIGN PATENT DOCUMENTS

| | | |
|---|---|---|
| CN | 111865830 | 10/2020 |
| WO | 2017082779 A1 | 5/2017 |
| WO | 2018166576 A1 | 9/2018 |
| WO | 2020104946 A1 | 5/2020 |
| WO | 2020165857 A1 | 8/2020 |

OTHER PUBLICATIONS

LG Electronics, "S2-1810280: Discussion on QoS in MA-PDU," 3GPP TSG-SA WG2 Meeting #129, Oct. 15-19, 2018, Dongguan, China, 9 pages.
Nokia, et al., "S2-1811209: TSN—QoS Framework," 3GPP SA WG2 Meeting #129, Oct. 15-19, 2018, Dongguan, China, 12 pages.
Examination Report for European Patent Application No. 20702358.1, dated Dec. 13, 2022, 9 pages.
Notice of Reasons for Rejection for Japanese Patent Application No. 2021-571531, dated Jan. 24, 2023, 8 pages.
Advisory Action for U.S. Appl. No. 17/431,202, dated Dec. 23, 2022, 4 pages.
Non-Final Office Action for U.S. Appl. No. 17/863,645, dated Jan. 10, 2023, 21 pages.
Author Unknown, "3rd Generation Partnership Project; Technical Specification Group Services and System Aspects; Study on Communication for Automation in Vertical Domains (Release 16)," 3GPP TR 22.804 V16.1.0, Sep. 2018, 3GPP Organizational Partners, 189 pages.
Author Unknown, "3rd Generation Partnership Project; Technical Specification Group Services and System Aspects; Study on 5GS Enhanced support of Vertical and LAN Services (Release 16)," 3GPP TR 23.734 V0.2.0, Sep. 2018, 3GPP Organizational Partners, 39 pages.
Author Unknown, "3rd Generation Partnership Project; Technical Specification Group Radio Access Network; Study on NR Industrial Internet of Things (IoT); Release 16," 3GPP TR 38.825 V0.0.0, Sep. 2018, 3GPP Organizational Partners, 10 pages.
Catt, "R2-1816363: 5GS and TSN Integration," 3GPP TSG-RAN WG2 Meeting #104, Nov. 12-16, 2018, Spokane, USA, 5 pages.
Ericsson, "S2-19xxxx: Support for IEEE 802.1Qbv scheduling," 3GPP TSG-SA WG2 Meeting #131, Feb. 25- Mar. 1, 2019, Santa Cruz, Spain, 7 pages.
Ericsson, "S2-19xxxx: TSN-5GS QoS parameters mapping," 3GPP TSG-SA WG2 Meeting #131, Feb. 25-Mar. 1, 2019, Santa Cruz, Spain, 13 pages.
Ericsson, "S2-1901721: Mapping of bridge port and QoS control in 5GS," 3GPP TSG-SA WG2 Meeting #131, Change Request, Feb. 25-Mar. 1, 2019, Santa Cruz, Spain, 7 pages.
Huawei et al., "S2-1811211: QoS Negotiation between 3GPP and TSN networks KI#3.1," SA WG2 Meeting #129, Oct. 15-19, 2018, Dongguan, China, 10 pages.
Nokia et al., "S2-1810436: TSN—QoS Framework," SA WG2 Meeting #129, Oct. 15-19, 2018, Dongguan, China, 9 pages.
Siemens AG, et al., "S1-183120: cyberCAV—5G in Industrial Automation: Different and Multiple Time Domains for Synchronization," 3GPP TSG-SA WG1 Meeting #84, Nov. 12-16, 2018, Spokane, Washington, 8 pages.
International Search Report and Written Opinion for International Patent Application No. PCT/IB2019/059942, dated Feb. 4, 2020, 17 pages.
Written Opinion for International Patent Application No. PCT/IB2019/059942, dated Oct. 7, 2020, 11 pages.
International Preliminary Report on Patentability for International Patent Application No. PCT/IB2019/059942, dated Feb. 9, 2021, 24 pages.
Invitation to Pay Additional Fees and Partial Search for International Patent Application No. PCT/IB2020/051264, dated May 8, 2020, 7 pages.
International Search Report and Written Opinion for International Patent Application No. PCT/IB2020/051264, dated Jun. 30, 2020, 16 pages.
Author Unknown, "Technical Specification Group Services and System Aspects; Study on enhancement of 5G System (5GS) for vertical and Local Area Network (LAN) services (Release 16)," Technical Report 23.734, Version 16.2.0, Jun. 2019, 3GPP Organizational Partners, 117 pages.
Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.
Author Unknown, "Technical Specification Group Services and System Aspects; Procedures for the 5G System; Stage 2 (Release 16)," Technical Specification 23.502, Version 16.0.2, Apr. 2019, 3GPP Organizational Partners, 419 pages.
Neumann, Arne, et al., "Towards Integration of Industrial Ethernet with 5G Mobile Networks," International Workshop on Factory Communication Systems, Jun. 2018, IEEE, 4 pages.
Nokia, et al., "S2-1903656: Update to Support PDU Session Binding," SA WG2 Meeting #132, Apr. 8-12, 2019, Xian, China, 4 pages.
Qualcomm Incorporated, et al., "S2-1906754: Addressing Editor's notes on TSN," 3GPP TSG-SA2 Meeting #133, May 13-17, 2019, Reno, Nevada, 13 pages.
Invitation to Pay Additional Fees and Partial Search for International Patent Application No. PCT/IB2020/054483, dated Aug. 17, 2020, 15 pages.
International Search Report and Written Opinion for International Patent Application No. PCT/IB2020/054483, dated Oct. 8, 2020, 21 pages.
Finn, "Introduction to Time-Sensitive Networking," IEEE Communications Standards Magazine, vol. 2, Issue 2, Jun. 2018, pp. 22-28.
Examination Report for Indian Patent Application No. 202147040911, dated Apr. 28, 2022, 6 pages.

(56) References Cited

OTHER PUBLICATIONS

Non-Final Office Action for U.S. Appl. No. 17/294,997, dated Apr. 14, 2022, 22 pages.
Second Office Action for Chinese Patent Application No. 202080014340.3, dated Jun. 28, 2022, 7 pages.
Examination Report for European Patent Application No. 20708642.2, dated Jun. 9, 2022, 7 pages.
Final Office Action for U.S. Appl. No. 17/294,997, dated Oct. 14, 2022, 27 pages.
Final Office Action for U.S. Appl. No. 17/431,202, dated Sep. 23, 2022, 16 pages.
Author Unknown, "Technical Specification Group Services and System Aspects; Study on Communication for Automation in Vertical Domains (Release 16)," Technical Report 22.804, Version 16.2.0, 3GPP Organizational Partners, Dec. 2018, 196 pages.
Author Unknown, "Technical Specification Group Services and System Aspects; Study on Cellular Internet of Things (IoT) support and evolution for the 5G System (Release 16)," Technical Report 23.724, Version 16.0.0, 3GPP Organizational Partners, Dec. 2018, 276 pages.
Author Unknown, "Technical Specification Group Services and System Aspects; Study on enhancement of 5GS for Vertical and LAN Services (Release 16)," Technical Report 23.734, Version 16.0.0, 3GPP Organizational Partners, Dec. 2018, 107 pages.
Author Unknown, "Technical Specification Group Services and System Aspects; Study on enhancement of 5GS for Vertical and LAN Services (Release 16)," Technical Report 23.734, Version 16.1.0, 3GPP Organizational Partners, Mar. 2019, 111 pages.
Author Unknown, "Technical Specification Group Services and System Aspects; Service requirements for cyber-physical control applications in vertical domains; Stage 1 (Release 16)," Technical Specification 22.104, Version 1.0.0, 3GPP Organizational Partners, Dec. 2018, 55 pages.
Author Unknown, "Technical Specification Group Services and System Aspects; System Architecture for the 5G System; Stage 2 (Release 15)," Technical Specification 23.501, Version 15.3.0, 3GPP Organizational Partners, Sep. 2018, 226 pages.
Author Unknown, "Technical Specification Group Services and System Aspects; System Architecture for the 5G System (5GS); Stage 2 (Release 15)," Technical Specification 23.501, Version 15.8.0, 3GPP Organizational Partners, Dec. 2019, 248 pages.
Author Unknown, "Technical Specification Group Services and System Aspects; Procedures for the 5G System; Stage 2 (Release 15)," Technical Specification 23.502, Version 15.4.0, 3GPP Organizational Partners, Dec. 2018, 346 pages.
Author Unknown, "Technical Specification Group Services and System Aspects; Policy and Charging Control Framework for the 5G System; Stage 2 (Release 15)," Technical Specification 23.503, Version 15.3.0, 3GPP Organizational Partners, Sep. 2018, 70 pages.
Author Unknown, "Technical Specification Group Services and System Aspects; Policy and Charging Control Framework for the 5G System; Stage 2 (Release 15)," Technical Specification 23.503, Version 15.4.0, 3GPP Organizational Partners, Dec. 2018, 76 pages.
Author Unknown, "Technical Specification Group Radio Access Network; NG-RAN; NG Application Protocol (NGAP) (Release 15)," Technical Specification 38.413, Version 15.5.0, 3GPP Organizational Partners, Sep. 2019, 329 pages.
Author Unknown, "IEEE Standard for Local and metropolitan area networks—Bridges and Bridged Networks, Amendment 25: Enhancements for Scheduled Traffic," IEEE Computer Society, IEEE Std 802.1Qbv, 2015, 57 pages.
Ericsson, "C3-182341: Changes to C3-182188: QoS Parameter mapping in PCF," Third Generation Partnership Project (3GPP), TSG-CT WG3 Meeting #96, Apr. 16-20, 2018, 8 pages, Kunming, China.
Ericsson, "S2-1900610: Additional TSN traffic patter for RAN optimization," Third Generation Partnership Project (3GPP), TSG-SA WG2 Meeting #130, Jan. 21-25, 2019, 6 pages, Kochi, India.

Ericsson, "S2-1901150: TSN QoS and traffic scheduling in 5GS," Third Generation Partnership Project (3GPP), TSG-SA WG2 Meeting #130, Jan. 21-25, 2019, 9 pages, Kochi, India.
Ericsson, "S2-1903375: TSN-5GS QoS mapping partly at AF and PCF," Third Generation Partnership Project (3GPP), TSG-SA WG2 Meeting #132, Apr. 8-12, 2019, 7 pages, Xi'an, China.
Kagermann, Prof. Dr. Henning, et al., "Recommendations for implementing the strategic initiative INDUSTRIE 4.0," Final report of the Industrie 4.0 working group, acatech—National Academy of Science and Engineering, Munich, Apr. 2013, 84 pages.
Kentis, Angelos Mimidis, et al., "Effects of Port Congestion in the Gate Control List Scheduling of Time Sensitive Networks," 8th International Conference on the Network of the Future (NOF), IEEE, 2017, pp. 138-140.
Nokia, et al., "R2-1814992: TSN performance requirements evaluation," Third Generation Partnership Project (3GPP), TSG-RAN WG2 Meeting #103bis, Oct. 8-12, 2018, 9 pages, Chengdu, China.
Nokia, et al., "R2-1817270: NR support for TSN traffic patterns," Third Generation Partnership Project (3GPP), TSG-RAN WG2 Meeting #104, Nov. 12-16, 2018, 9 pages, Spokane, USA.
Invitation to Pay Additional Fees and Partial Search for International Patent Application No. PCT/IB2020/050181, dated Apr. 1, 2020, 14 pages.
International Search Report and Written Opinion for International Patent Application No. PCT/IB2020/050181, dated May 18, 2020, 28 pages.
Author Unknown, "Draft Standard for Local and metropolitan area networks—Bridges and Bridged Networks; Amendment: Stream Reservation Protocol (SRP) Enhancements and Performance Improvements," IEEE P802.1Qcc/D2.3, May 3, 2018, 214 pages.
Huawei, et al., "S2-1900590: Discussion on system enhancement for TSN logical bridge management," 3GPP TSG-SA WG2 Meeting #130, Jan. 21-25, 2019, Kochi, India, 4 pages.
Office Action for Chinese Patent Application No. 202080014340.3, dated Jan. 21, 2022, 6 pages.
Non-Final Office Action for U.S. Appl. No. 17/431,202, dated Feb. 9, 2022, 19 pages.
Craciunas, "Scheduling Real-Time Communications in IEEE 802.1Qbv Time Sensitive Networks," 24th International Conference on Real-Time Networks and Systems, Oct. 2016, pp. 183-192.
Final Office Action for U.S. Appl. No. 17/294,997, dated Jul. 7, 2023, 28 pages.
Notice of Allowance for U.S. Appl. No. 17/863,645, dated Jul. 20, 2023, 8 pages.
Non-Final Office Action for U.S. Appl. No. 18/106,761, dated Jul. 19, 2023, 19 pages.
Examination Report for European Patent Application No. 19809637.2, dated Jun. 23, 2023, 8 pages.
Advisory Action for U.S. Appl. No. 17/294,997, dated Sep. 20, 2023, 4 pages.
Non-Final Office Action for U.S. Appl. No. 17/294,997, dated Dec. 7, 2023, 34 pages.
Notice of Non-Compliant Amendment for U.S. Appl. No. 18/106,761, dated Oct. 30, 2023, 4 pages.
Notice of Allowance for U.S. Appl. No. 18/106,761, dated Jan. 24, 2024, 8 pages.
Non-Final Office Action for U.S. Appl. No. 17/616,139, dated Jan. 4, 2024, 15 pages.
Non-Final Office Action for U.S. Appl. No. 17/294,997, dated Mar. 30, 2023, 25 pages.
Huawei, et al., "S2-1811021; QoS negotiation between 3GPP and TSN networks KI#3.1," 3GPP SA WG2 Meeting #129, Oct. 15-19, 2018, Dogguan, China, 9 pages.
Huawei, et al., "S2-1812232: Updates on Solution #18," 3GPP TSG-SA WG2 Meeting #Bis, Nov. 26-30, 2018, West Palm Beach, Florida, 8 pages.
Qualcomm Incorporated, et al., "S2-1904620: Addressing Editor's notes on TSN," 3GPP TSG-SA2 Meeting #132, Apr. 8-12, 2019, Xi'an, China, 11 pages.
Intention to Grant for European Patent Application No. 20726558.8, mailed May 10, 2024, 50 pages.

\* cited by examiner

TSN-CELLULAR COMMUNICATION SYSTEM QoS MAPPING AND RAN OPTIMIZATION BASED ON TSN TRAFFIC PATTERN RELATED INFORMATION

RELATED APPLICATIONS

This application is a 35 U.S.C. § 371 national phase filing of International Application No. PCT/IB2020/050181, filed Jan. 10, 2020, which claims the benefit of provisional patent application Ser. No. 62/792,430, filed Jan. 15, 2019, the disclosures of which are hereby incorporated herein by reference in their entireties.

TECHNICAL FIELD

The present disclosure relates to a cellular communications system and, more specifically, to a cellular communications system that operates as a virtual node in a Time-Sensitive Networking (TSN) network.

BACKGROUND

The manufacturing industry is undergoing a digital transformation towards the "Fourth Industrial Revolution" (Industry 4.0) [1] towards smart manufacturing. Flexible connectivity infrastructure is a key enabler for manufacturing to interconnect machines, products, and all kinds of other devices in a flexible, secure, and consistent manner.

The Third Generation Partnership Project (3GPP) Fifth Generation (5G) system, as an alternative to or complementing the wired connectivity solution, should support new requirements and challenges coming from these vertical domains. 3GPP has a study on Communication for Automation in Vertical Domains (Technical Report (TR) 22.804), where many use cases from vertical domains are analyzed. Industrial automation applications such as motion control have extremely stringent service requirements on high availability, ultra-reliable, low latency, low jitter, and determinism, e.g., 1-10 milliseconds (ms) end-to-end latency, 1-100 microsecond (µs) packet delay variation [2].

Today, wireline fieldbus solutions such as PROFINET®, EtherCAT®, and Ethernet/Internet Protocol (IP) are mostly used in the factory shop floor to interconnect sensors, actuators, and controllers in an automation system. Institute of Electrical and Electronics Engineers (IEEE) 802.1 Time-Sensitive Networking (TSN) as a novel technology will be able to provide manufacturing industries with deterministic, guaranteed latencies and extremely low packet loss services through standard IEEE 802 networks in the near future.

One of the IEEE 802.1 TSN standards, 802.1Qbv, can provide on-time delivery of TSN frames. It defines a means to transmit certain Ethernet frames on a time-based schedule. IEEE 802.1Qbv requires time synchronization, i.e. each bridge has to be aware of the same time.

FIG. 1 shows an example of a TSN setup 100. An industrial controller 102 on the right-hand side of the figure and a robot 104 on the left-hand side of the figure are called end stations that are connected through several TSN bridges 106. In this specific example, there are three TSN bridges, denoted as TSN bridges 106-1, 106-2, and 106-3. The TSN network can be configured in different ways. In a static configuration, the end stations 102 and 104 and the TSN bridges 106 are configured during network setup. In a centralized network configuration setup, all configurations of TSN bridges 106 for TSN streams is performed by a Centralized Network Configuration (CNC) station 108, which configures the network resource reservations and is responsible for coordinating any changes to those configured reservations with any new reservations. Reservations can be made or requested by end stations. In a fully centralized setup where both the network and the user configuration are centralized, the CNC station 108 receives the requirements of the data flows from a Central User Configuration (CUC) entity 110 and then computes the route, the time schedules needed for the end-to-end transmission for each TSN flow, and configures the TSN bridges 106 with the computed time schedule.

There currently exist certain challenge(s). It is desirable to utilize a 5G System (5GS) as a virtual TSN node (e.g., a virtual TSN bridge). This brings about new challenges that must be addressed.

SUMMARY

Systems and methods related to integration of a Time-Sensitive Networking (TSN) network and a cellular communications system and, more specifically, TSN-cellular communication system Quality of Service (QoS) mapping and Radio Access Network (RAN) optimization based on TSN traffic pattern related information. Embodiments of a method of operation of TSN application function are disclosed. In some embodiments, a method of operation of a TSN application function associated with a cellular communications system that operates as a virtual TSN node in a TSN system comprises receiving, from a controller associated with the TSN system, one or more TSN QoS parameters for the virtual TSN node. The method further comprises providing, to a core network function in a core network of the cellular communications system, the one or more TSN QoS parameters for the virtual TSN node.

In some embodiments, the one or more TSN QoS parameters for the virtual TSN node comprise one or more QoS parameters for TSN traffic transmission. In some embodiments, the one or more QoS parameters for TSN traffic transmission comprise: (a) a latency of the virtual TSN node, (b) bandwidth information, (c) a priority level of one or more TSN streams to be communicated via the virtual TSN node, or any combination of two or more of (a)-(c).

In some embodiments, the method further comprises receiving, from the controller associated with the TSN system, information related to a traffic pattern for the virtual TSN node, and providing, to the core network function in the core network of the cellular communications system, the information related to the traffic pattern for the virtual TSN node. In some embodiments, the information related to the traffic pattern for the virtual TSN node comprises gate control parameters for scheduled traffic. In some embodiments, the information related to the traffic pattern for the virtual TSN node comprises parameters that are not included in a model of the cellular communications system that are needed for the cellular communications system to fulfill TSN QoS requirements of TSN communications.

In some embodiments, the core network function is a Policy Control Function (PCF).

In some embodiments, the cellular communications system is a Fifth Generation System (5GS). Further, in some embodiments, the core network function is a PCF in the 5GS.

Embodiments of a TSN application function are also disclosed. In some embodiments, a TSN application function associated with a cellular communications system that operates as a virtual TSN node in a TSN system is adapted to receive, from a controller associated with the TSN system, one or more TSN QoS parameters for the virtual TSN node and provide the one or more TSN QoS parameters for the virtual TSN node to a core network function in a core network of the cellular communications system.

In some embodiments, the TSN application function is implemented on a network node, wherein the network node comprises processing circuitry configured to, in order to perform operations of the TSN application function, cause the network node to receive the one or more TSN QoS parameters for the virtual TSN node from the controller associated with the TSN system and provide the one or more TSN QoS parameters for the virtual TSN node to the core network function.

Embodiments of a method of operation of a core network function are also disclosed. In some embodiments, a method of operation of a core network function in a cellular communications system that operates as a virtual TSN node in a TSN system comprises receiving, from a TSN application function, one or more TSN QoS parameters for the virtual TSN node and mapping the one or more TSN QoS parameters to one or more QoS policies in the cellular communications system, one or more rules in the cellular communications system, or both one or more QoS policies in the cellular communications system and one or more rules in the cellular communications system. The method further comprises applying the one or more QoS policies, the one or more rules, or both the one or more QoS policies and the one or more rules in the cellular communications system.

In some embodiments, the one or more TSN QoS parameters for the virtual TSN node comprise one or more QoS parameters for TSN traffic transmission. In some embodiments, the one or more QoS parameters for TSN traffic transmission comprise: (a) a latency of the virtual TSN node, (b) bandwidth information, (c) priority level of one or more TSN streams to be communicated via the virtual TSN node, or any combination of two or more of (a)-(c).

In some embodiments, the method further comprises receiving, from the TSN application function, information related to a traffic pattern for the virtual TSN node (206-3). The method further comprises providing, directly or indirectly, at least some of the information related to the traffic pattern for the virtual TSN node to another node in the cellular communications system. In some embodiments, the information related to the traffic pattern for the virtual TSN node comprises gate control parameters for scheduled traffic. In some embodiments, the information related to the traffic pattern for the virtual TSN node comprises parameters that are not included in a model of the cellular communications system that are needed for the cellular communications system to fulfill TSN QoS requirements of TSN communications.

In some embodiments, the cellular communications system is a 5GS and, for TSN traffic in an uplink direction, providing the at least some of the information related to the traffic pattern for the virtual TSN node to another node in the cellular communications system comprises providing, directly or indirectly, the at least some of the information related to the traffic pattern for the virtual TSN node to a User Plane Function (UPF) in a core network of the 5GS that operates as part of the virtual TSN node.

In some embodiments, the cellular communication system is a 5GS and, for TSN traffic in a downlink direction, providing the at least some of the information related to the traffic pattern for the virtual TSN node to another node in the cellular communications system comprises providing, directly or indirectly, the at least some of the information related to the traffic pattern for the virtual TSN node to a User Equipment (UE) that operates as part of the virtual TSN node.

In some embodiments, applying the one or more QoS policies, the one or more rules, or both the one or more QoS policies and the one or more rules, in the cellular communications system, comprises triggering a Packet Data Unit (PDU) session modification procedure to establish a new QoS flow for TSN traffic according to the one or more QoS policies, the one or more rules, or both the one or more QoS policies and the one or more rules.

In some embodiments, the cellular communications system is a 5GS. In some embodiments, the core network function is a Policy Control Function (PCF).

Corresponding embodiments of a core network function are also disclosed. In some embodiments, a core network function for a cellular communications system that operates as a virtual TSN node in a TSN system is adapted to receive one or more TSN QoS parameters for the virtual TSN node, map the one or more TSN QoS parameters to one or more QoS policies in the cellular communications system, one or more rules in the cellular communications system, or both one or more QoS policies in the cellular communications system and one or more rules in the cellular communications system, and apply the one or more QoS policies, the one or more rules, or both the one or more QoS policies and the one or more rules, in the cellular communications system.

In some embodiments, the core network function is implemented on a network node, wherein the network node comprises processing circuitry configured to, in order to perform operations of the core network function, cause the network node to receive the one or more TSN QoS parameters for the virtual TSN node, map the one or more TSN QoS parameters to one or more QoS policies in the cellular communications system, one or more rules in the cellular communications system, or both one or more QoS policies in the cellular communications system and one or more rules in the cellular communications system, and apply the one or more QoS policies, the one or more rules, or both the one or more QoS policies and the one or more rules in the cellular communications system.

Embodiments of a method of operation of a node in a cellular communications system where the cellular communications system operates as a virtual TSN node in a TSN system are also disclosed. In some embodiments, a method of operation of a node in a cellular communications system where the cellular communications system operates as a virtual TSN node in a TSN system comprises receiving, from another node in the cellular communications system, information related to a traffic pattern for the virtual TSN node and forwarding the information to an associated traffic translator such that the associated traffic translator outputs TSN traffic in accordance with the traffic pattern for the virtual TSN node.

In some embodiments, the cellular communication system is a 5GS and, for TSN traffic in a downlink direction, the node is a UE that operates as part of the virtual TSN node.

In some embodiments, the cellular communication system is a 5GS and, for TSN traffic in an uplink direction, the node is a UPF in a core network of the 5GS that operates as part of the virtual TSN node.

Corresponding embodiments of a node in a cellular communications system where the cellular communications system operates as a virtual TSN node in a TSN system are also disclosed. In some embodiments, a node in a cellular communications system where the cellular communications system operates as a virtual TSN node in a TSN system is adapted to receive, from another node in the cellular communications system, information related to a traffic pattern for the virtual TSN node and forward the information to an associated traffic translator such that the associated traffic translator outputs TSN traffic in accordance with the traffic pattern for the virtual TSN node.

In some embodiments, the node comprises processing circuitry configured to cause the node to receive, from another node in the cellular communications system, information related to a traffic pattern for the virtual TSN node and forward the information to an associated traffic translator such that the associated traffic translator outputs TSN traffic in accordance with the traffic pattern for the virtual TSN node.

Embodiments of a method of operation of a radio access node are also disclosed. In some embodiments, a method of operation of a radio access node in a radio access network of a cellular communications system, the cellular communications system operating as a virtual TSN node in a TSN system, comprises receiving information related to a traffic pattern for a preceding TSN node in the TSN system, wherein the preceding TSN node is a TSN node in the TSN system that precedes the virtual TSN node in a direction of TSN traffic flow. The method further comprises performing one or more actions based on the received information.

In some embodiments, the one or more actions are related to optimization of the radio access network for TSN traffic.

In some embodiments, the one or more actions comprise providing an associated UE with Semi-Persistent Scheduling (SPS) or configured grants configurations, based on the received information.

In some embodiments, the received information comprises periodicity.

In some embodiments, the received information comprises periodicity of TSN traffic received by the virtual TSN node from the preceding TSN node.

In some embodiments, the received information comprises message size.

In some embodiments, the received information comprises message size of TSN traffic received by the virtual TSN node from the preceding TSN node.

In some embodiments, the received information comprises information on when periodic data is to arrive at the virtual TSN node from the preceding TSN node.

Corresponding embodiments of a radio access node are also disclosed. In some embodiments, a radio access node in a radio access network of a cellular communications system, the cellular communications system operating as a virtual TSN node in a TSN system, is adapted to receive information related to a traffic pattern for a preceding TSN node in the TSN system, wherein the preceding TSN node is a TSN node in the TSN system that precedes the virtual TSN node in a direction of TSN traffic flow. The radio access node is further adapted to perform one or more actions based on the received information.

In some embodiments, the radio access node comprises processing circuitry configured to cause the radio access node to receive the information related to the traffic pattern for the preceding TSN node in the TSN system and perform the one or more actions based on the received information.

In some embodiments, a method performed for operating a cellular communications system as a virtual TSN node in a TSN system comprises, at a TSN application function associated with the cellular communications system, receiving one or more TSN QoS parameters for the virtual TSN node from a controller associated with the TSN system and providing the one or more TSN QoS parameters for the virtual TSN node to a core network function in a core network of the cellular communications system. The method further comprises, at the core network function, receiving the one or more TSN QoS parameters for the virtual TSN node, mapping the one or more TSN QoS parameters to one or more QoS policies in the cellular communications system, one or more rules in the cellular communications system, or both one or more QoS policies in the cellular communications system and one or more rules in the cellular communications system, and applying the one or more QoS policies, the one or more rules, or both the one or more QoS policies and the one or more rules, in the cellular communications system.

In some embodiments, the method further comprises, at the TSN application function, receiving information related to a traffic pattern for the virtual TSN node from the controller associated with the TSN system and providing the information related to the traffic pattern for the virtual TSN node to the core network function in the core network of the cellular communications system. The method further comprises, at the core network function, receiving the one or more TSN QoS parameters for the virtual TSN node and the information related to the traffic pattern for the virtual TSN node and providing, directly or indirectly, at least some of the information related to the traffic pattern for the virtual TSN node to another node in the cellular communications system. The method further comprises, at the another node in the cellular communications system, receiving, from the core network function, the at least some of the information related to the traffic pattern for the virtual TSN node and forwarding the at least some of the information to an associated traffic translator such that the associated traffic translator outputs TSN traffic in accordance with the traffic pattern for the virtual TSN node.

Some other embodiments of a method of operation of a TSN application function are also disclosed. In some embodiments, a method of operation of a TSN application function associated with a cellular communications system that operates as a virtual TSN node in a TSN system comprises receiving, from a controller associated with the TSN system, information related to a traffic pattern for a preceding TSN node in the TSN system, wherein the preceding TSN node is a TSN node in the TSN system that precedes the virtual TSN node in a direction of TSN traffic flow. The method further comprises providing, to a core network function in a core network of the cellular communications system, the information related to the traffic pattern for the preceding TSN node.

In some embodiments, the information related to the traffic pattern for the preceding TSN node comprises periodicity, message size, or both periodicity and message size.

In some embodiments, the information related to the traffic pattern for the preceding TSN node comprises information on when periodic TSN data from the preceding TSN node is to arrive at the virtual TSN node.

In some embodiments, the core network function is a PCF.

In some embodiments, the cellular communications system is a 5GS. In some embodiments, the core network function is a PCF.

Corresponding embodiments of a TSN application function are also disclosed. In some embodiments, a TSN application function associated with a cellular communications system that operates as a virtual TSN node in a TSN system is adapted to receive, from a controller associated with the TSN system, information related to a traffic pattern for a preceding TSN node in the TSN system, wherein the preceding TSN node is a TSN node in the TSN system that precedes the virtual TSN node in a direction of TSN traffic flow. The TSN application function is further adapted to provide, to a core network function in a core network of the cellular communications system, the information related to the traffic pattern for the preceding TSN node.

In some embodiments, the TSN application function is implemented on a network node, wherein the network node comprises processing circuitry configured to, in order to perform operations of the TSN application function, cause the network node to receive the information related to the traffic pattern for the preceding TSN node from the controller associated with the TSN system and provide the information related to the traffic pattern for the preceding TSN node to the core network function.

Some other embodiments of a method of operation of a core network function are also disclosed. In some embodiments, a method of operation of a core network function in a cellular communications system that operates as a virtual TSN node in a TSN system comprises receiving information related to a traffic pattern for a preceding TSN node in the TSN system, wherein the preceding TSN node is a TSN node in the TSN system that precedes the virtual TSN node in a direction of TSN traffic flow. The method further comprises providing, directly or indirectly, at least some of the information related to the traffic pattern for the preceding TSN node to one or more radio access nodes in the cellular communications system.

In some embodiments, the information related to the traffic pattern for the preceding TSN node comprises periodicity, message size, or both periodicity and message size.

In some embodiments, the information related to the traffic pattern for the preceding TSN node comprises information on when periodic TSN data from the preceding TSN node is to arrive at the virtual TSN node.

In some embodiments, the cellular communications system is a 5GS. In some embodiments, the core network function is a PCF.

Corresponding embodiments of a core network function are also disclosed. In some embodiments, a core network function for a cellular communications system that operates as a virtual TSN node in a TSN system is adapted to receive information related to a traffic pattern for a preceding TSN node in the TSN system, wherein the preceding TSN node is a TSN node in the TSN system that precedes the virtual TSN node in a direction of TSN traffic flow. The core network function is further adapted to provide, directly or indirectly, at least some of the information related to the traffic pattern for the preceding TSN node to one or more radio access nodes in the cellular communications system.

In some embodiments, the core network function is implemented on a network node, wherein the network node comprises processing circuitry configured to, in order to perform operations of the core network function, cause the network node to receive the information related to a traffic pattern for the preceding TSN node and provide, directly or indirectly, the at least some of the information related to the traffic pattern for the preceding TSN node to the one or more radio access nodes in the cellular communications system.

In some embodiments, a method performed for operating a cellular communications system as a virtual TSN node in a TSN system comprises, at a TSN application function associated with the cellular communications system, receiving information related to a traffic pattern for a preceding TSN node in the TSN system from a controller associated with the TSN system, wherein the preceding TSN node is a TSN node in the TSN system that precedes the virtual TSN node in a direction of TSN traffic flow. The method further comprises, at the TSN application function, providing the information related to the traffic pattern for the preceding TSN node to a core network function in a core network of the cellular communications system. The method further comprises, at the core network function, receiving the information related to the traffic pattern for the preceding TSN node and providing, directly or indirectly, at least some of the information related to the traffic pattern for the preceding TSN node to one or more radio access nodes in the cellular communications system.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
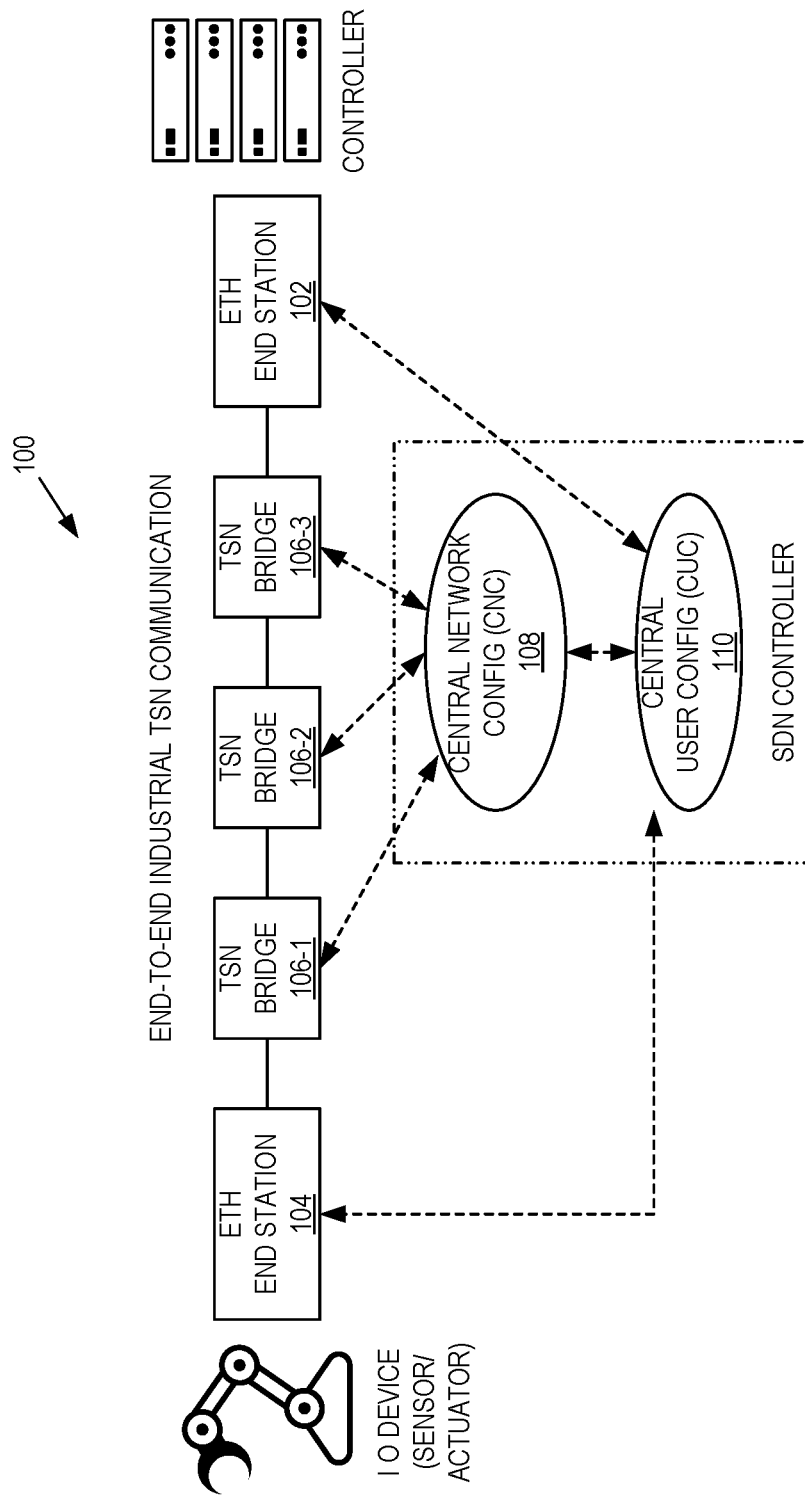
FIG. 1 illustrates an example of a Time-Sensitive Networking (TSN) setup.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that while embodiments described herein focus on a 5G System (5GS), the present disclosure is not limited to the use of a 5GS. Any suitable cellular or mobile communications system may be used.

As discussed above, it is desirable to utilize a 5GS as a virtual Time-Sensitive Networking (TSN) node (e.g., a virtual TSN bridge). This brings about new challenges that must be addressed. Certain aspects of the present disclosure and their embodiments may provide solutions to the aforementioned or other challenges. In some embodiments, a cellular communications system (e.g., a 5GS) operates as a (virtual) TSN node (e.g., a (virtual) TSN bridge), and the cellular communications system obtains (e.g., from a controller of the TSN) one or more TSN Quality of Service (QoS) parameters for the virtual TSN node and information related to a traffic pattern for the virtual TSN node. The TSN QoS parameters are mapped to QoS policy(ies) and/or rule(s) in the cellular communication system and are applied in the cellular communications system in order to satisfy the TSN QoS requirements for the virtual TSN node. In addition, at least some of the information related to the traffic pattern for the virtual TSN node is provided to an appropriate edge node(s) (e.g., the UPF for uplink direction or the UE for downlink direction) where this information is used by the edge node(s) to achieve the desired traffic pattern. In one example implementation in which the cellular communication system is a 5GS, the TSN QoS parameters and the information related to the traffic pattern for the virtual TSN node are obtained at a TSN application function (e.g., from a controller of the TSN) and provided to a PCF. The PCF then maps the TSN QoS parameters to 5GS policy(ies) and/or 5GS rule(s) and applies the 5GS policy(ies) and/or 5GS rule(s) in the 5GS, with respect to TSN traffic. In addition, the PCF provides (directly or indirectly) at least some of the information related to the traffic pattern for the virtual TSN node to the UE (for TSN traffic flow in the downlink direction) or the UPF (for TSN traffic flow in the uplink direction).

In some other embodiments, a cellular communications system (e.g., a 5GS) operates as a (virtual) TSN node (e.g., a (virtual) TSN bridge), and the cellular communications system obtains (e.g., from a controller of the TSN) information related to a traffic pattern for a preceding TSN node in the TSN (i.e., a TSN node that precedes the virtual TSN node in a direction of TSN traffic flow). At least some of the information related to the traffic pattern for the preceding TSN node is provided to one or more radio access nodes (e.g., gNB(s)) and, e.g., used by the radio access node(s) for radio optimization. In one example implementation in which the cellular communication system is a 5GS, the information related to the traffic pattern for the preceding TSN node is obtained at a TSN application function (e.g., from a controller of the TSN) and provided to a PCF. The PCF provides (directly or indirectly) at least some of the information related to the traffic pattern for the preceding TSN node to one or more radio access node(s) (e.g., gNB(s)), e.g., where this information is used for radio optimization.

The embodiments above can be used separately or in combination.

Certain embodiments may provide one or more of the following technical advantage(s). For example, the embodiments described herein provide improved performance of a cellular communications system (e.g., a 5GS) as a virtual TSN node.

Figure 2:
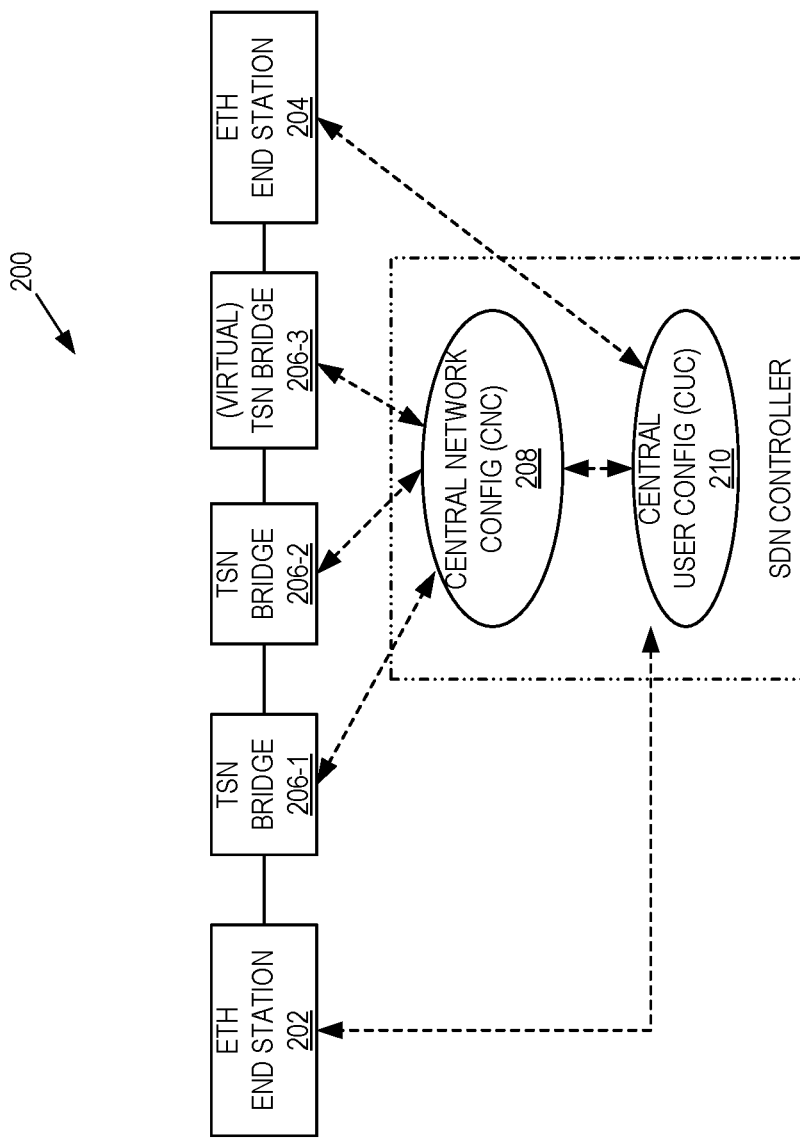
FIG. 2 illustrates an example of a TSN system including a virtual TSN node in which embodiments of the present disclosure may be implemented.

In this regard, FIG. 2 shows an example of a TSN system 200 including a virtual TSN node in which embodiments of the present disclosure may be implemented. As illustrated, the TSN system 200 includes end stations 202 and 204 that are connected via a number of TSN bridges 206. In this specific example, there are three TSN bridges, denoted as TSN bridges 206-1, 206-2, and 206-3. Importantly, in this example, one of the TSN bridges 206 is a virtual TSN bridge. While not being limited thereto, in this example, the TSN bridge 206-3 is a virtual TSN bridge. Further, in the example embodiments described herein, the virtual TSN bridge 206-3 is implemented by a 5GS.

In a static configuration, the end stations 202 and 204 and the TSN bridges 206 are configured during network setup. In a centralized network configuration setup, all configurations of the TSN bridges 206 for TSN streams is performed by a Centralized Network Configuration (CNC) station 208, which configures the network resource reservations and is responsible for coordinating any changes to those configured reservations with any new reservations. Reservations can be made or requested by the end stations 202 and 204. In a fully centralized setup where both the network and the user configuration are centralized, the CNC station 208 receives the requirements of the data flows from a Central User Configuration (CUC) entity 210 and then computes the route, the time schedules needed for the end-to-end transmission for each TSN flow, and configures the TSN bridges 206 with the computed time schedule.

Figure 3:
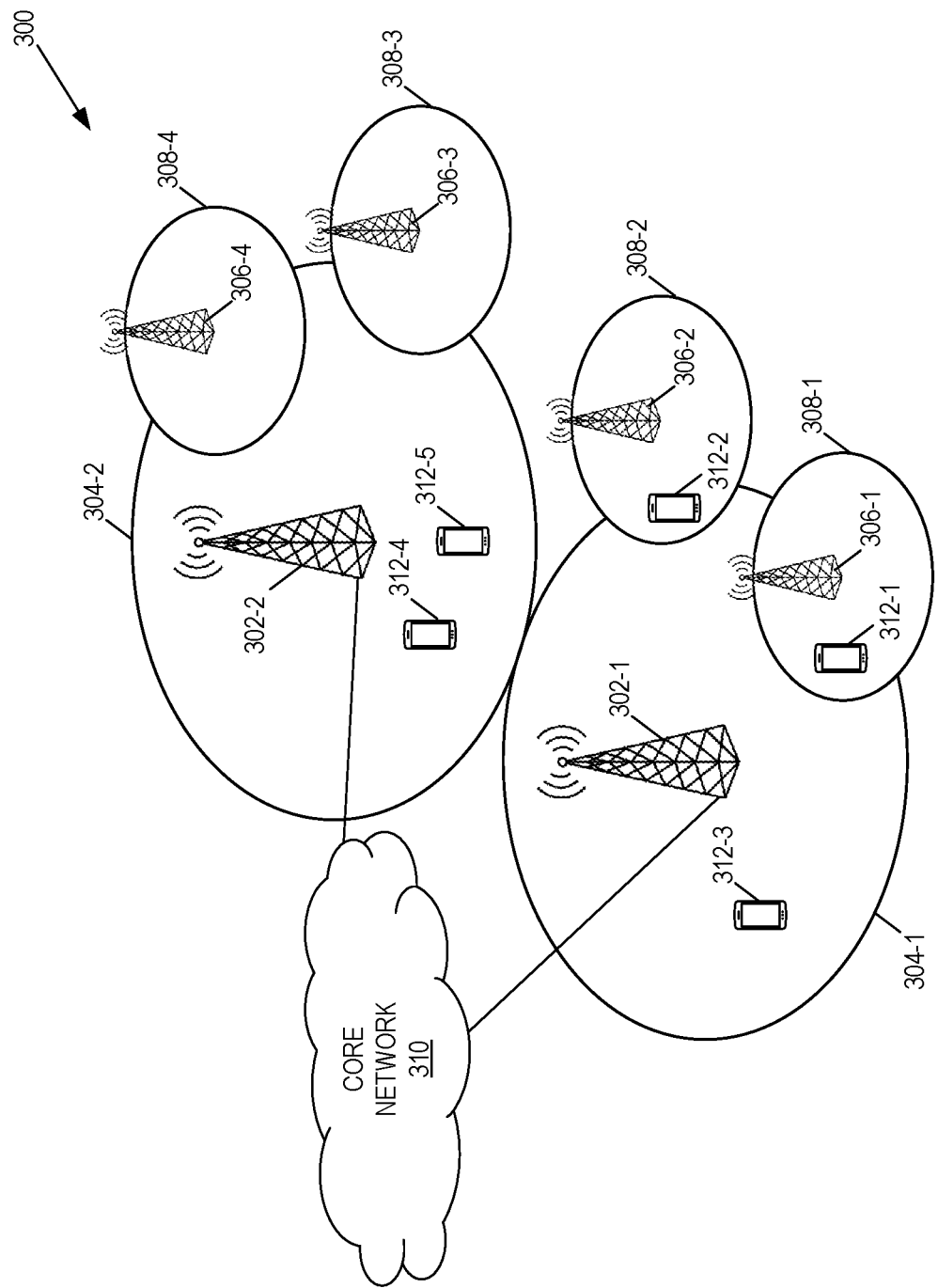
FIG. 3 illustrates one example of a cellular communications network according to some embodiments of the present disclosure.

Before describing embodiments of the present disclosure in more detail, a brief discussion of a 5GS is beneficial. In this regard, FIG. 3 illustrates one example of a cellular communications system 300 according to some embodiments of the present disclosure. In the embodiments described herein, the cellular communications system 300 is a 5GS. In this example, the cellular communications network 300 includes base stations 302-1 and 302-2, which in 5G NR are referred to as gNBs, controlling corresponding macro cells 304-1 and 304-2. The base stations 302-1 and 302-2 are generally referred to herein collectively as base stations 302 and individually as base station 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
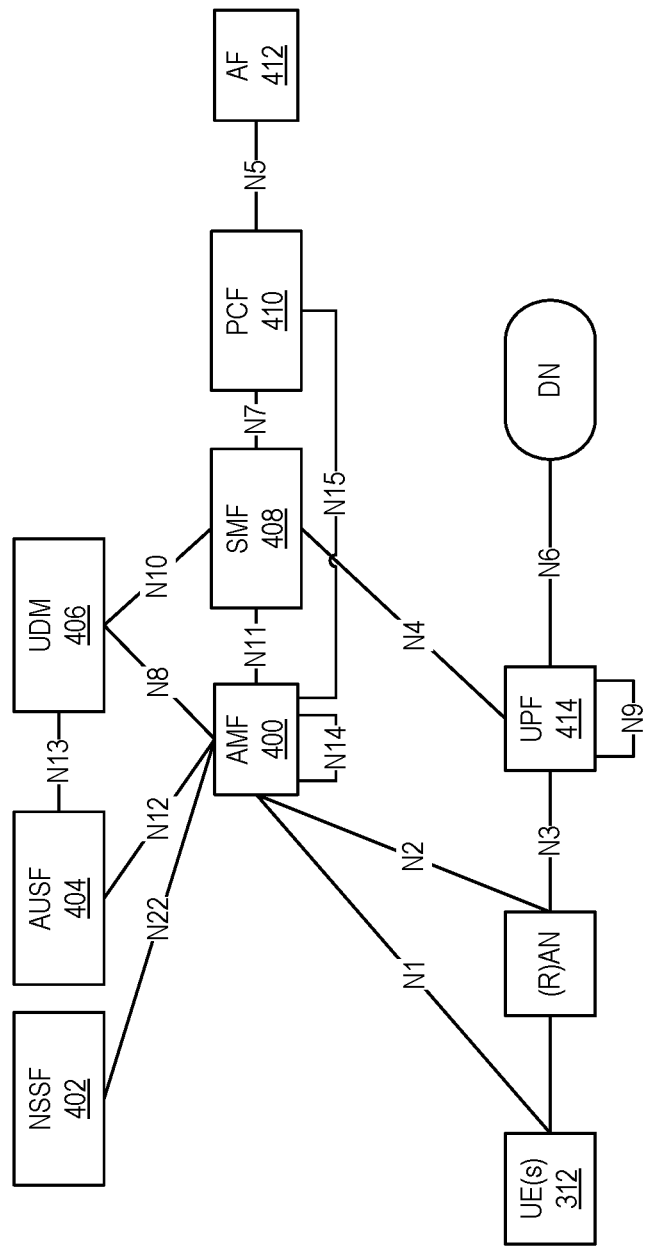
FIG. 4 illustrates a wireless communication system represented as a Fifth Generation (5G) network architecture composed of core Network Functions (NFs), where interaction between any two NFs is represented by a point-to-point reference point/interface.

FIG. 4 illustrates a wireless communication system represented as a 5G network architecture composed of core Network Functions (NFs), where interaction between any two NFs is represented by a point-to-point reference point/ interface. FIG. 4 can be viewed as one particular implementation of the system 300 of FIG. 3.

Seen from the access side the 5G network architecture shown in FIG. 4 comprises a plurality of UEs 312 connected to either a RAN or an Access Network (AN) as well as an AMF 400. Typically, the R(AN) comprises base stations 202, e.g. such as eNBs or gNBs or similar. Seen from the core network side, the 5G core NFs shown in FIG. 4 include a NSSF 402, an AUSF 404, a UDM 406, the AMF 400, a SMF 408, a PCF 410, an Application Function (AF) 412, and a UPF 414.

Reference point representations of the 5G network architecture are used to develop detailed call flows in the normative standardization. The N1 reference point is defined to carry signaling between the UE 312 and the AMF 400. The reference points for connecting between the AN and the AMF 400 and between the AN and the UPF 414 are defined as N2 and N3, respectively. There is a reference point, N11, between the AMF 400 and the SMF 408. N4 is used by the SMF 408 and the UPF 414 so that the UPF 414 can be set using the control signal generated by the SMF 408, and the UPF 414 can report its state to the SMF 408. N9 is the reference point for the connection between different UPFs 414, and N14 is the reference point connecting between different AMFs 400, respectively. N15 and N7 are defined since the PCF 410 applies policy to the AMF 400 and the SMF 408, respectively. N12 is required for the AMF 400 to perform authentication of the UE 312. N8 and N10 are defined because the subscription data of the UE is required for the AMF 400 and the SMF 408.

The 5G core network aims at separating user plane and control plane. The user plane carries user traffic while the control plane carries signaling in the network. In FIG. 4, the UPF 414 is in the user plane and all other NFs, i.e., the AMF 400, SMF 408, PCF 410, AF 412, NSSF 402, AUSF 404, and UDM 406, are in the control plane. Separating the user and control planes guarantees each plane resource to be scaled independently. It also allows UPFs 414 to be deployed separately from control plane functions in a distributed fashion. In this architecture, UPFs 414 may be deployed very close to UEs 312 to shorten the Round Trip Time (RTT) between UEs 312 and data network for some applications requiring low latency.

The core 5G network architecture is composed of modularized functions. For example, the AMF 400 and SMF 408 are independent functions in the control plane. Separated AMF 400 and SMF 408 allow independent evolution and scaling. Other control plane functions like the PCF 410 and AUSF 404 can be separated as shown in FIG. 4. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs 414.

Figure 5:
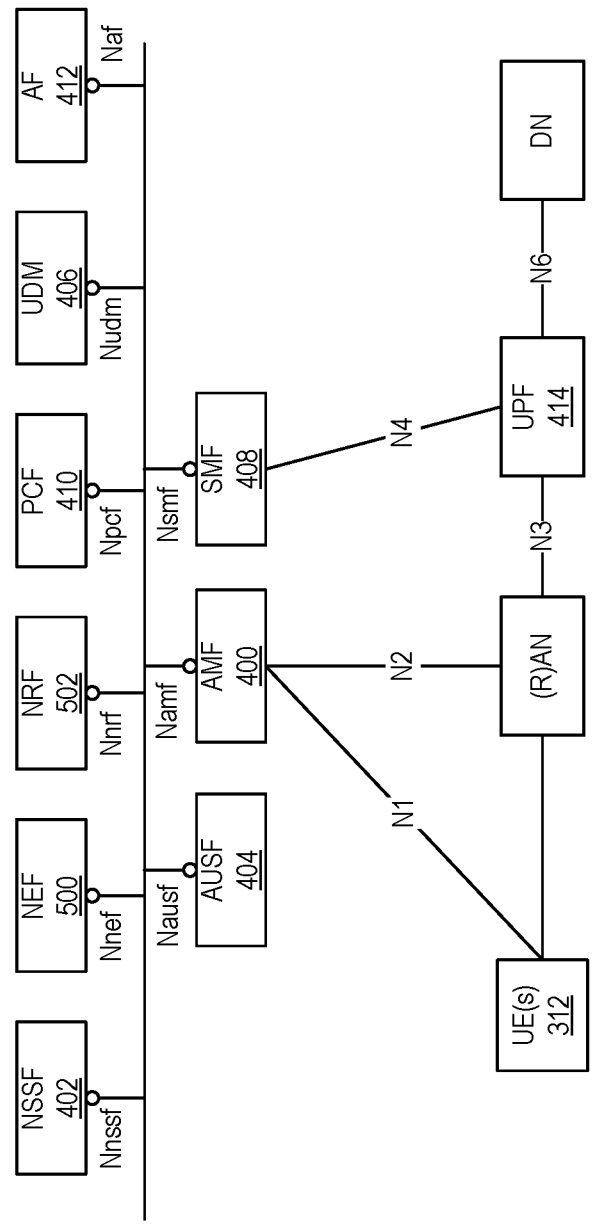
FIG. 5 illustrates a 5G network architecture using service-based interfaces between the NFs in the control plane, instead of the point-to-point reference points/interfaces used in the 5G network architecture of FIG. 4.

FIG. 5 illustrates a 5G network architecture using service-based interfaces between the NFs in the control plane, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g. Namf for the service based interface of the AMF 400 and Nsmf for the service based interface of the SMF 408, etc. The Network Exposure Function (NEF) 500 and the NRF 502 in FIG. 5 are not shown in FIG. 4 discussed above. However, it should be clarified that all NFs depicted in FIG. 4 can interact with the NEF 500 and the NRF 502 of FIG. 5 as necessary, though not explicitly indicated in FIG. 4.

Some properties of the NFs shown in FIGS. 4 and 5 may be described in the following manner. The AMF 400 provides UE-based authentication, authorization, mobility management, etc. A UE 312 even using multiple access technologies is basically connected to a single AMF 400 because the AMF 400 is independent of the access technologies. The SMF 408 is responsible for session management and allocates Internet Protocol (IP) addresses to UEs 312. It also selects and controls the UPF 414 for data transfer. If a UE 312 has multiple sessions, different SMFs 408 may be allocated to each session to manage them individually and possibly provide different functionalities per session. The AF 412 provides information on the packet flow to the PCF 410 responsible for policy control in order to support QoS. Based on the information, the PCF 410 determines policies about mobility and session management to make the AMF 400 and SMF 408 operate properly. The AUSF 404 supports authentication function for UEs 312 or similar and thus stores data for authentication of UEs 312 or similar while the UDM 406 stores subscription data of the UE 312. The Data Network (DN), which is not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Now, turning to some example embodiments of the present disclosure. Note that this discussion focuses on 5GS; however, the present disclosure is not limited thereto. Note that while the discussion below describes "first embodiments" and "second embodiments" in separate sections, these embodiments may be used separately or in combination.

First Embodiments

3GPP Technical Report (TR) 23.724 Solution #8 provides an option for 5GS appearing as a (virtual) TSN bridge (black box) for integration with TSN, as described in section 6.8 of 3GPP TR 23.724.

However, there are still some open issues regarding:
1. The mapping between QoS requirements of the TSN communication and QoS models in the serving 5GS.
2. The QoS framework enhancement to support deterministic QoS and fulfill the requirements for time-sensitive communication Categorization of TSN related QoS information: In the first embodiments, the related QoS information supporting TSN communication is categorized into two parts, namely:
1. TSN QoS Characteristics: The TSN QoS characteristics include QoS parameters for TSN traffic transmission, such as latency of the TSN bridge, bandwidth information, priority level of TSN streams, etc. This part of the information can be mapped into QoS parameters in 5G QoS flows.
2. TSN Traffic Pattern: The TSN traffic pattern includes information for TSN supporting, such as gate control parameters for scheduled traffic, etc. This part of the information is identified as additional parameters for 5GS to fulfill the QoS requirement of TSN communications, which is not included in the 5G QoS model.

5GS support for TSN traffic scheduling: Periodic deterministic communication is often used in factory automation processes. Such communication has stringent requirements on timeliness and availability of the communication service (see, e.g., 3GPP Technical Specification (TS) 22.104). Many critical industrial applications have a need for frame delivery that is highly predictable in terms of the time at which frame transmission will occur. Time-aware scheduled traffic at the output of the TSN bridge is an approach as defined in Institute of Electrical and Electronics Engineers (IEEE) 802.1 Qbv. Such traffic has a certain traffic pattern, e.g. periodicity due to the time-aware traffic scheduling. When a 5GS is integrated with a TSN network as a virtual TSN bridge, if there is no proper scheduling mechanism applied at the output of the 5GS to fulfill the TSN scheduling requirement, the traffic coming out of the 5GS may overflow the next TSN nodes, and hence lead to congestion losses.

Some solutions have been proposed on how to achieve determinism in 5GS. 3GPP TR 23.724 Solution #16 describes an example of deterministic data flow defined by a window at both the ingress and egress side of 5GS. A de-jittering function deployed at the edges of the 5GS (e.g., UPF in uplink, and UE in downlink) can be used to achieve deterministic communications on an end-to-end basis as described in, e.g., RAN2-1814992. However, the output scheduling of the 5GS has not been addressed.

Observation 1: Both 5GS determinism and output scheduling at the edge of 5GS are needed in order to provide periodic deterministic communication services. While the determinism issue has been studied in 3GPP TR 23.734, the output scheduling is rarely addressed.

Figure 6:
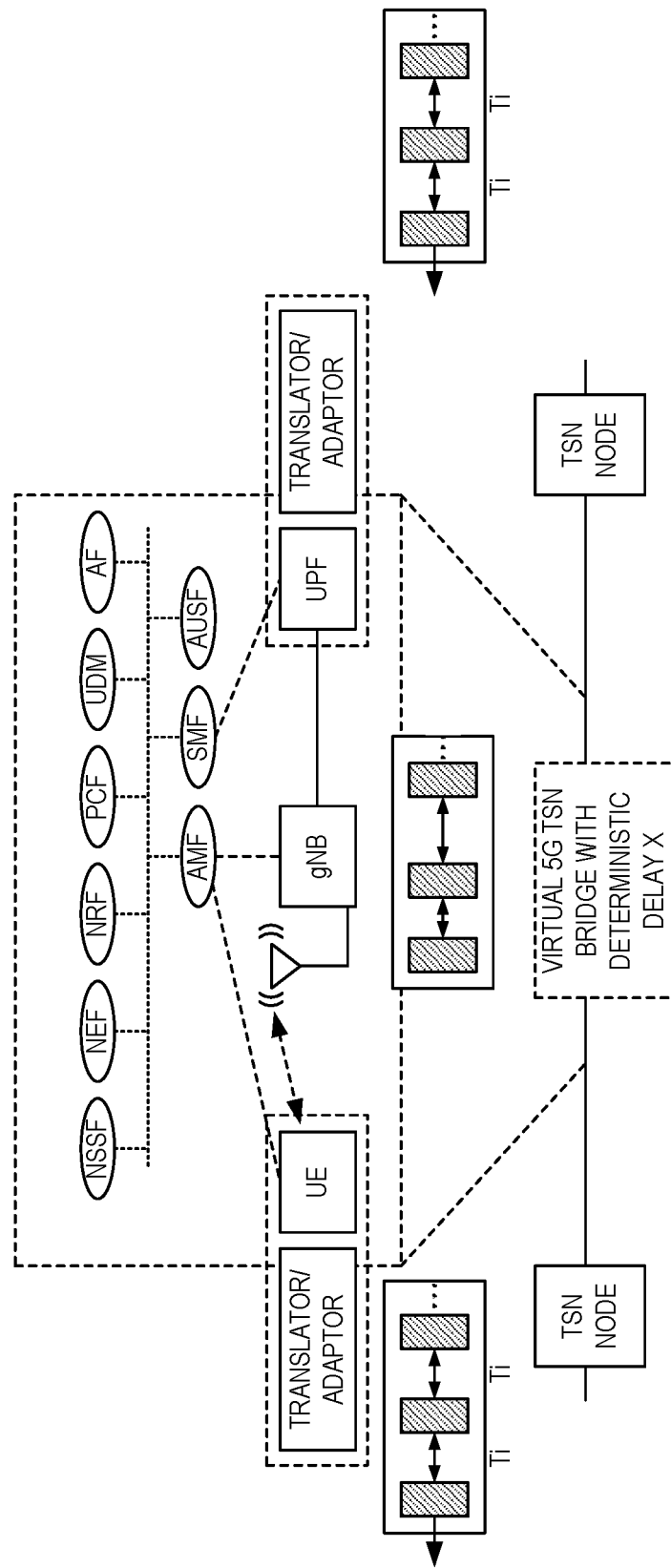
FIG. 6 illustrates a downlink example of 5G System (5GS) support for periodic deterministic communication.

FIG. 6 illustrates a downlink example of 5GS support for periodic deterministic communication. In other words, FIG. 6 shows an example of 5GS output scheduling for downlink traffic. The 5GS is modelled as a virtual TSN bridge as described in 3GPP TR 23.724 Solution #8. The incoming TSN traffic from the preceding TSN node (right side) enters the 5GS at the UPF 414 or the UPF-side translator with an interval of Ti. A de-jitter function (called a Hold and Forward Buffer in Solution #16) can be applied at the output of the 5GS, which, in this downlink case, is at the UE 312 or the UE side translator. The de-jitter function holds up the TSN traffic up to the maximum 5GS delay (worst-case delay), and then forwards it to the next TSN node. The 5GS deterministic delay (denoted as "X" in FIG. 6) therefore can be achieved as the maximum 5GS delay. The de-jitter function can only provide 5GS with deterministic latency; however, the periodicity or schedule of the TSN traffic can be lost due to the delay variations inside the 5GS. In order to fulfill the TSN latency and traffic profile requirements, the output pacing at egress of 5GS is needed. The UE 312 or the UE side translator can learn the TSN scheduling information from the CNC, and then re-generate the scheduled TSN traffic pattern at the output of the 5G virtual bridge. For an uplink case, the de-jitter function and output scheduling/pacing function can be deployed at the UPF 414 or the translator at the UPF side.

5G virtual bridge registration: Based on the system architecture described in FIG. 6.8-1 and FIG. 6.8-2 of 3GPP TR 23.724 Solution #8, the 5GS appears to the external network as a TSN bridge. 5GS-specific procedures in the Core Network (CN) and RAN, wireless communication links, etc. remain hidden from the TSN network. The 5GS bridge provides TSN ingress and egress ports via the so-called TSN Translator (device) on the UE side and via the "TSN Translator" (Control Plane (CP) and User Plane (UP)) on the CN side towards the DN.

The TSN Translator in CP (acting as a TSN AF) can collect 5GS virtual bridge related information (such as topology information, bridge capabilities) and register to the CNC as a TSN bridge.

5G virtual bridge configuration: The CNC of the TSN network can collect talkers' and listeners' stream requirements, from a CUC on behalf of end stations, and configure TSN-capable bridges to meet these requirements. Here, a "talker" is the sender or source, and a "listener" is the receiver or destination. For a 5G virtual bridge, the CNC negotiates the QoS requirement with the PCF via a TSN AF. The TSN AF and PCF divide the TSN requirements into two parts: TSN QoS characteristics and traffic pattern information.

Figure 7:
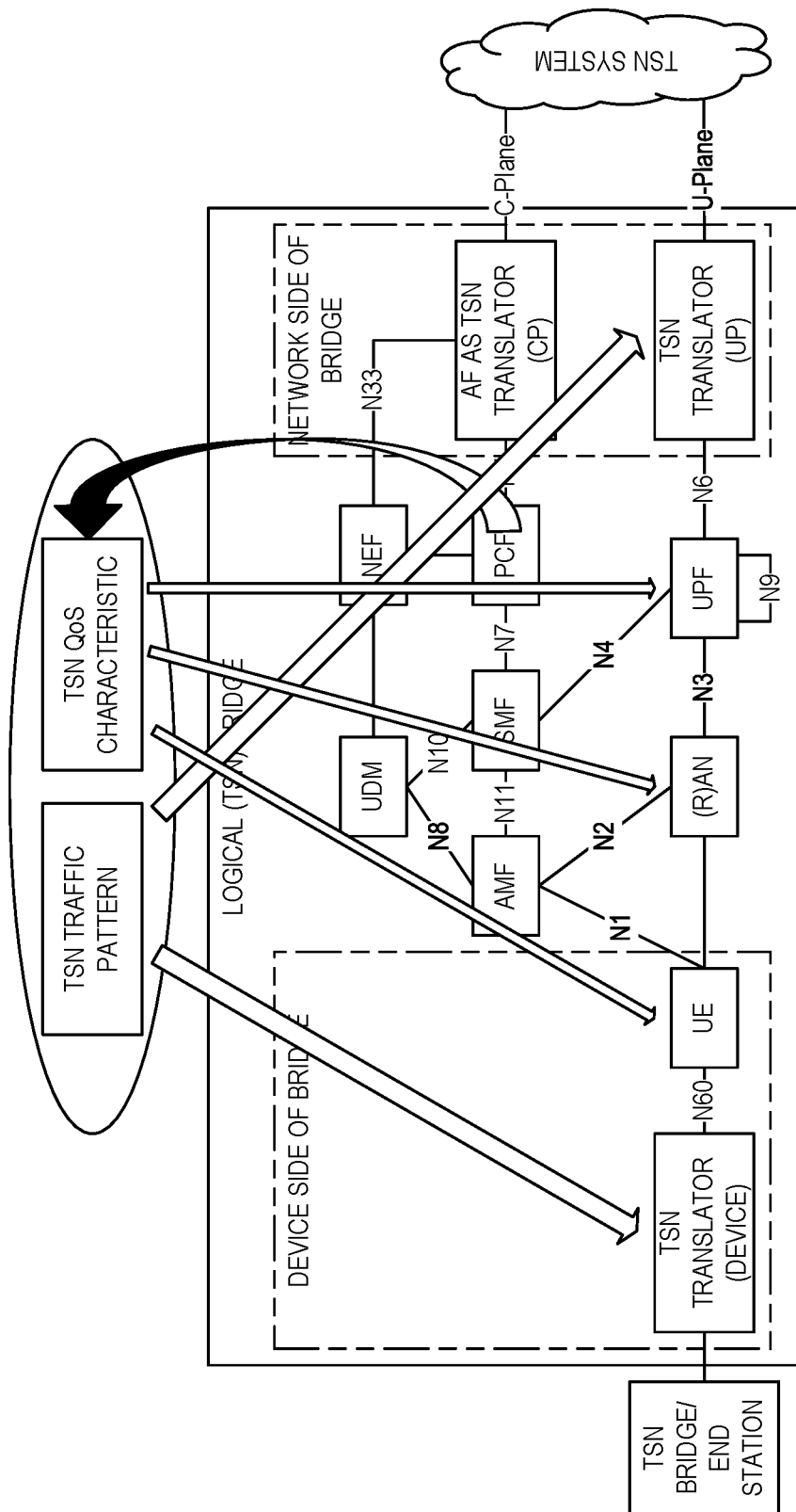
FIG. 7 is an illustration of an example framework of TSN Quality of Service (QoS) mapping in 5GS, in accordance with some embodiments of the present disclosure.

FIG. 7 is an illustration of an example framework of TSN QoS mapping in 5GS. In other words, FIG. 7 shows 5G virtual bridge configuration for both TSN QoS characteristics and traffic pattern. The TSN QoS characteristics can be mapped into the QoS parameters of the 5G QoS flows and controlled by the SMF 408 to configure the UE 1412, the base station 302 (i.e., the gNB), and the UPF 414 for QoS enforcement (see 3GPP TS 23.501 clause 5.7).

Figure 8:
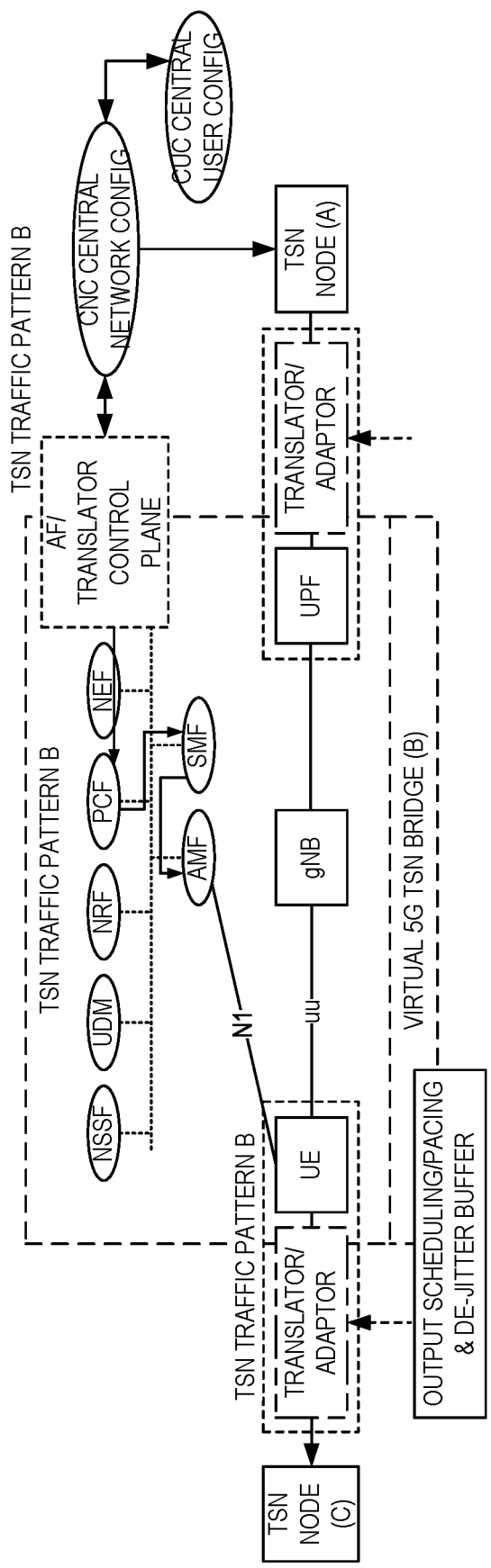
FIG. 8 is an illustration of downlink output scheduling/pacing using a TSN traffic pattern from a Centralized Network Configuration (CNC) entity of the TSN system in accordance with some embodiments of the present disclosure.
Figure 9:
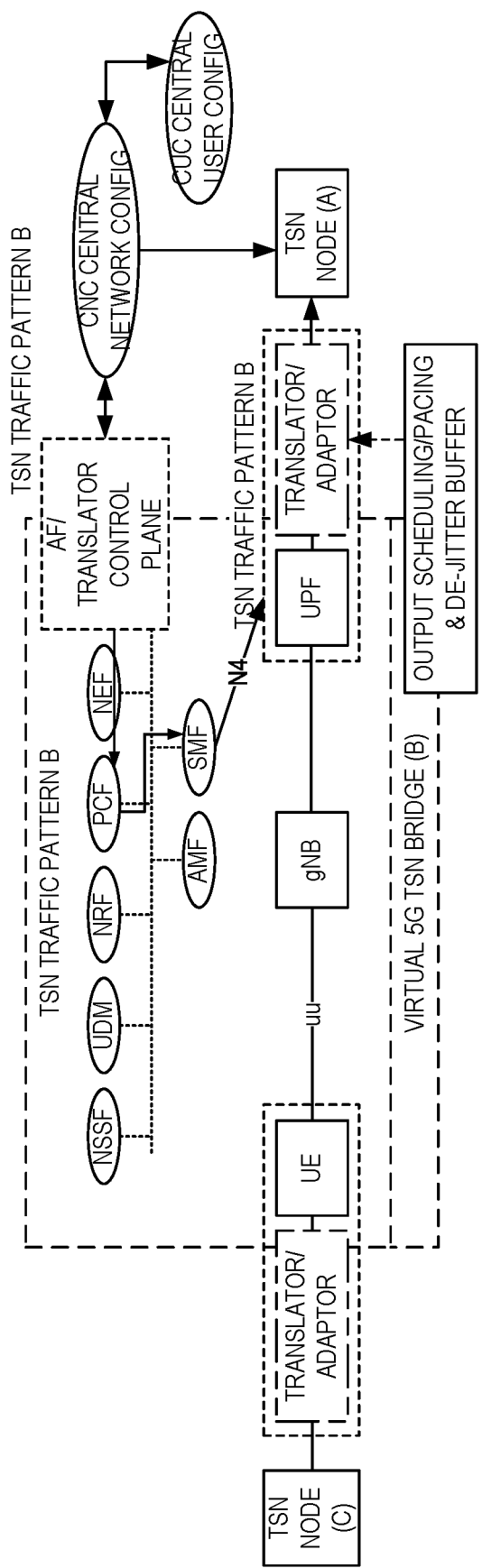
FIG. 9 is an illustration of uplink output scheduling/pacing using a TSN traffic pattern from a CNC of the TSN system in accordance with some embodiments of the present disclosure.

The traffic pattern is applied for time-aware traffic scheduling, which requires very low, predictable latency. Time-aware traffic scheduling operates using a set of time-aware gates that precede a bridge's transmission selection function. When 5GS appears as a TSN bridge, the time-aware gates are deployed in TSN ingress and egress ports, e.g. the TSN Translators in the UE and UPF. The TSN traffic pattern should be made available at the UE side translator for downlink as FIG. 8 shows, and at the UPF side translator for uplink direction as FIG. 9 shows. Then the translator can use the traffic pattern information to perform output scheduling/pacing towards the next TSN node.

The CNC has pre-scheduled the traffic pattern for every TSN bridge egress. Every TSN bridge should receive the traffic pattern from the CNC and send out the traffic according to the pre-scheduled pattern. FIG. 8 is an illustration of downlink output scheduling/pacing using a TSN traffic pattern from the CNC. In other words, FIG. 8 illustrates 5GS downlink output scheduling. There are three TSN nodes. The 5GS is modelled as TSN bridge (B), it receives TSN traffic from a preceding TSN node (A), then it sends out TSN traffic to TSN node (C) with a specific "traffic pattern B" which is received from the CNC. TSN nodes (A) and (C) can be either a bridge or an end-station. FIG. 9 shows an uplink case. In other words, FIG. 9 is an illustration of uplink output scheduling/packing using a TSN traffic pattern from the CNC.

Figure 10:
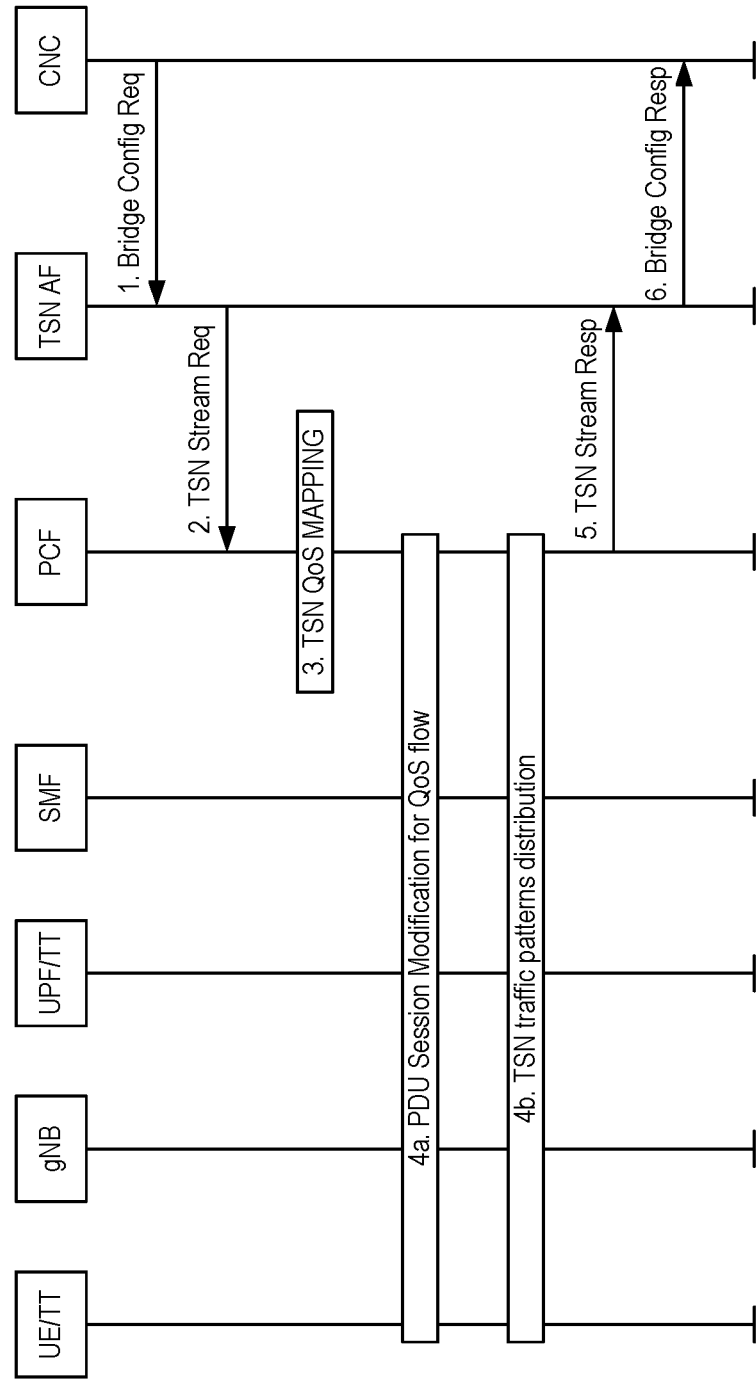
FIG. 10 illustrates the operation of a 5GS to provide an example implementation of first embodiments of the present disclosure.

FIG. 10 illustrates the operation of the 5GS to provide an example implementation of the first embodiments. In particular, FIG. 10 illustrates a procedure for TSN related QoS configuration for a 5G virtual bridge. The steps of the procedure of FIG. 10 are as follows.

Step 1: Based on the stream requirements from end stations (e.g., end stations 202 and 204), the CNC (e.g., a CNC station 208) computes a transmission schedule and network paths. The CNC distributes the TSN QoS requirements and traffic pattern (specific for current node) to the 5G virtual bridge (e.g., the virtual TSN bridge 206-3) via a TSN AF (e.g., an AF 412). Alternatively, the 5GS virtual bridge (e.g., the TSN AF) may pre-request or query the CNC for the TSN QoS and traffic information.

Step 2: The TSN AF forwards the TSN QoS requirements and traffic pattern to the PCF (e.g., PCF 410), directly or via the NEF (e.g., NEF 500).

Step 3: The PCF finds suitable 5G QoS policies and rules that can fulfill the TSN QoS characteristics (i.e., maps the TSN QoS characteristics to 5G QoS profiles).

Step 4: In step 4a, the PCF triggers the PDU session modification procedure to establish a new 5G QoS flow according to the selected QoS policies and rules. The SMF (e.g., SMF 408) configures the UE (e.g., UE 312), gNB (e.g., base station 302), and UPF (e.g., UPF 414) for QoS enforcement according to existing 3GPP procedure (see 3GPP TS 23.501 V15.8.0 clause 5.7). Every QoS flow has a QoS Flow Identifier (QFI). Therefore, for every mapped TSN flow, the QFI can be used to identify the link between the TSN traffic profile and the QoS flow. An example mapping can be: QFI←→5G QoS profile←→TSN QoS characteristics←→TSN traffic profile.

In step 4b, in a downlink direction, the PCF distributes the TSN traffic pattern to the UE via the SMF, e.g. Non-Access Stratum (NAS) signaling at PDU session setup/modification procedure. A new information element may be added to provide TSN traffic pattern information which is associated to a QFI, then the UE can forward the TSN traffic pattern to the UE side translator.

In an uplink direction, the PCF distributes the TSN traffic pattern to the UPF via the SMF, e.g. 3GPP signaling at Protocol Data Unit (PDU) session establishment/modification procedure, N4 session establishment/modification procedure. A new information element may be added to provide TSN traffic pattern information which is associated to a QFI.

The UPF side translator can get the traffic pattern for a specific TSN flow from the UPF and perform output scheduling/pacing at the egress port.

Step 5: The PCF responds to the TSN AF (directly or via the NEF).

Step 6: The TSN AF responds to the CNC.

The solution described above provides an approach of mapping between TSN

QoS requirement and 5G QoS model, with the following achievements:

Minimized the impact to existing 5G QoS model.
Minimized the impact to the traffic without scheduling requirement.
More flexible configuration for time-aware traffic scheduling.
Applicable for both TSN Translator inside and outside UPF/UE.

Second Embodiments

RAN awareness of incoming TSN traffic pattern: In 3GPP, the RAN group has an ongoing discussion on making use of the knowledge of the traffic pattern for radio optimization, e.g. to provide the UE with proper Semi-Persistent Scheduling (SPS) or Configured Grants configurations. Therefore, information of the traffic pattern (also referred to herein as "information related to the traffic pattern") such as periodicity and message size would be preferable. Also, information on when the periodic data arrives, i.e., a time reference or offset would be helpful. If such information is not available at the RAN, over-scheduling would need to be done in order to meet the TSN traffic requirements (e.g., latency). During such over-scheduling, the RAN could learn the traffic pattern and reduce its over-scheduling; however, radio resources, i.e. capacity, would be wasted during such a learning phase. Also, admission control for further users would need to be done more conservatively, if the actual resource need for current traffic is unclear. For those reasons, it would be beneficial for the RAN, if knowledge of the TSN traffic pattern, which is available at the 5G core interacting with TSN CNC, could be provided to the RAN beforehand.

It is particularly important for uplink traffic, where frequent pre-scheduling, e.g. configured grants, would need to be proactively provided to the UE in order to meet uplink latency requirements. I.e., in particular for uplink scheduling, the RAN would benefit from the traffic knowledge.

Observation: For better serving TSN periodic traffic, there is a need from the RAN to use the incoming TSN traffic pattern for radio optimization.

Proposal: 5G core network should provide/relay TSN traffic pattern of the incoming TSN traffic to the gNB so that the gNB can use the information to do better radio optimization.

Figure 11:
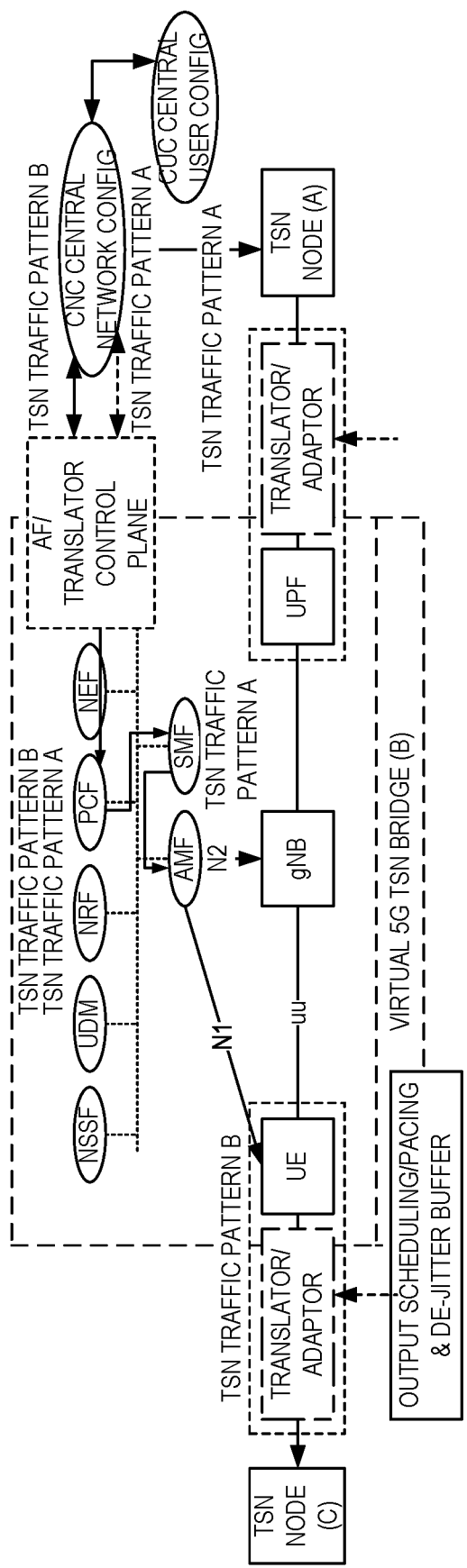
FIG. 11 illustrates 5GS downlink output scheduling.

Solution: The CNC has pre-scheduled the traffic pattern for every TSN bridge egress. Every TSN bridge should receive the traffic pattern from the CNC and send out the traffic according to the pre-scheduled pattern. FIG. 11 illustrates 5GS downlink output scheduling. FIG. 11 is an illustration of delivery of an additional TSN traffic pattern to the RAN for radio optimization (downlink). There are three TSN nodes. The 5GS is modelled as TSN bridge (B). The TSN bridge (B) receives "TSN traffic pattern B" for doing output scheduling at the UE for downlink traffic towards TSN node (C). The TSN node (A) is the preceding node of the 5GS. The output traffic from TSN node (A) follows "traffic pattern A." The CNC has both "traffic pattern A and B" information. Normally, the CNC only sends the relevant traffic pattern information to the bridge who needs to use it for output scheduling, e.g. "traffic pattern A" is only sent to TSN node (A). Therefore, for the output scheduling purpose, the 5GS only needs to distribute the "TSN traffic pattern B" from the AF to the UE translator in the downlink direction. However, in order to optimize radio resource for TSN traffic, the gNB needs to be aware of the incoming TSN traffic pattern. Therefore 5GS requests "TSN traffic pattern A" from the CNC, and then forward it to the gNB.

Figure 12:
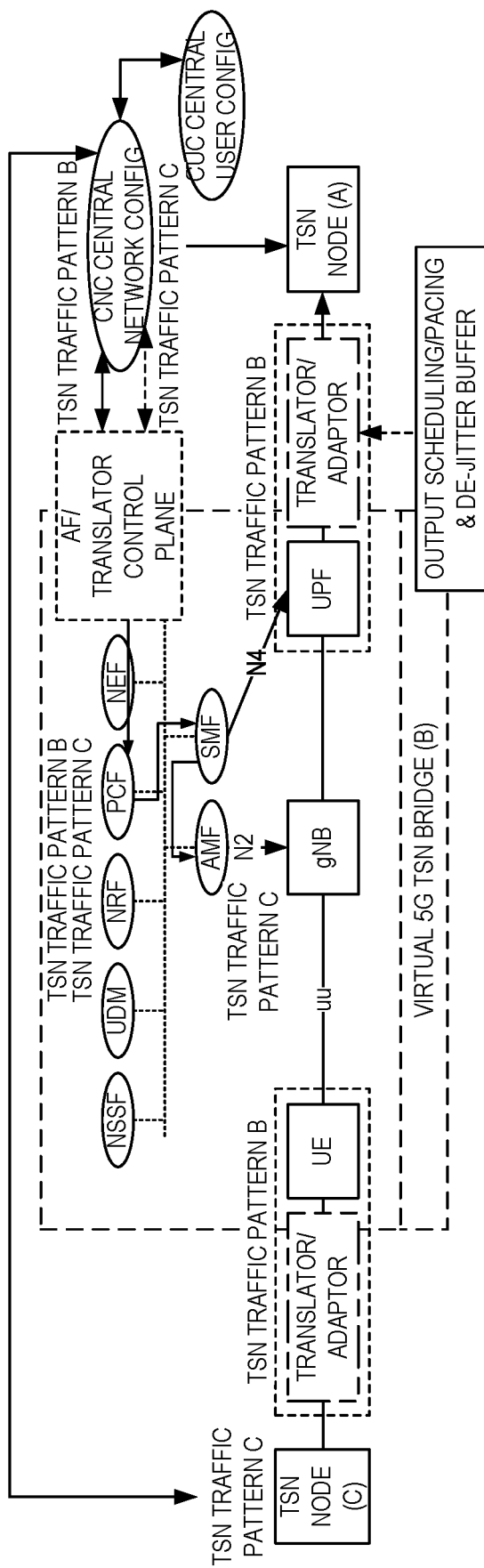
FIG. 12 is an illustration of delivery of an additional TSN traffic pattern to the Radio Access Network (RAN) for radio optimization for an uplink scenario, in accordance with some embodiments of the present disclosure.

FIG. 12 is an illustration of delivery of an additional TSN traffic pattern to the RAN for radio optimization (uplink). In other words, FIG. 12 shows an uplink case where the TSN node (C) is the preceding node to 5GS. Therefore, besides the "TSN traffic pattern B" that is required for 5GS output scheduling, "traffic pattern C" is additionally delivered to the gNB for radio optimization purpose.

Figure 13:
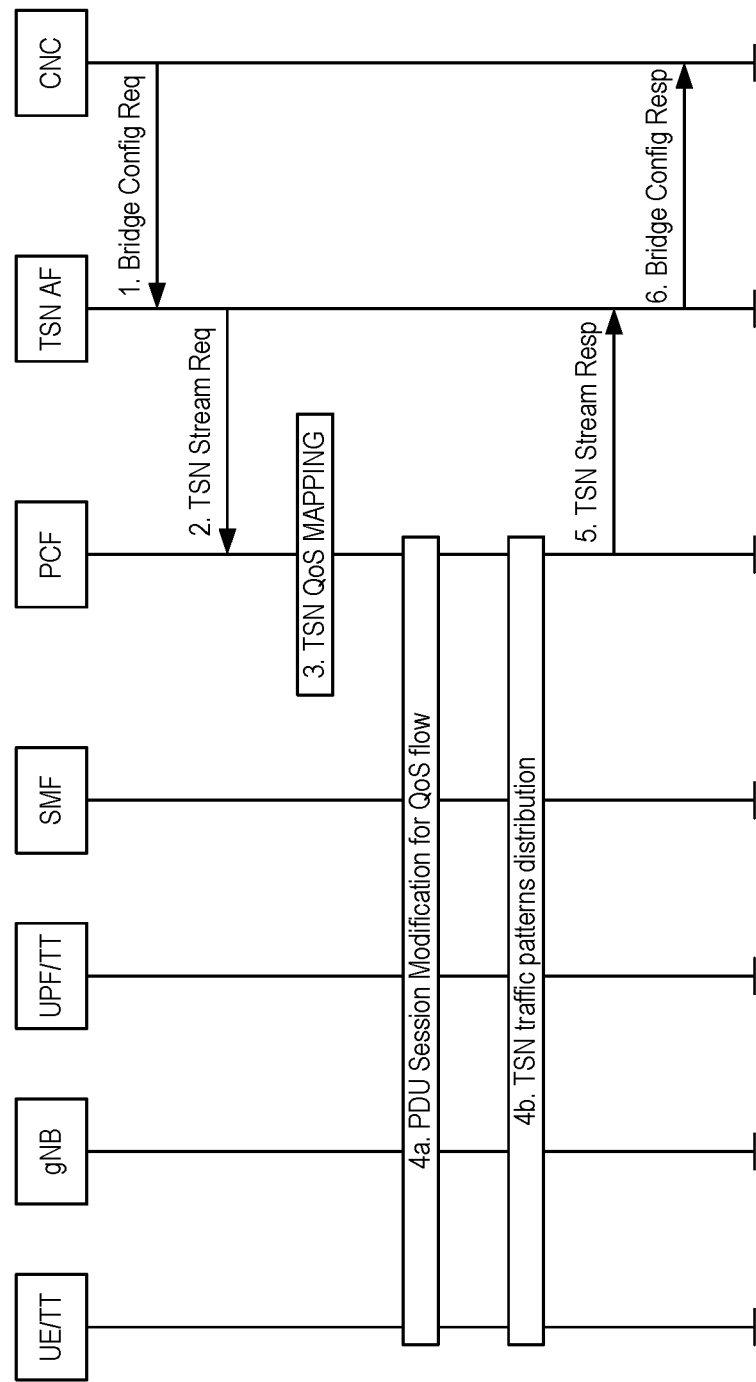
FIG. 13 illustrates the operation of a 5GS to provide an example implementation of second embodiments of the present disclosure.

FIG. 13 illustrates the operation of the 5GS to provide an example implementation of the second embodiments. In particular, FIG. 13 illustrates a procedure in which the 5GS distributes an additional TSN traffic pattern to the gNB for radio optimization purpose. The steps of the procedure of FIG. 13 are as follows.

Note that the delivery of the TSN traffic pattern used by the current node for 5GS output scheduling has been described above with respect to the first embodiments and, e.g., FIG. 10. The following procedure describes the differences that relate to delivery of an additional TSN traffic pattern used by the preceding node.

Step 1: The CNC (e.g., CNC station 208) distributes the TSN QoS requirements and traffic pattern (specific for the current node) to the 5G virtual bridge (e.g., the virtual TSN bridge 206-3) via the TSN AF (e.g., AF 412). For radio optimization purpose, the AF can request the additional traffic pattern for the preceding TSN node from the CNC (e.g., triggered by CNC configuration event), i.e. when the CNC sends TSN QoS requirements and "traffic pattern B" to the AF as part of the bridge configuration request, the AF then asks the CNC for additional TSN traffic pattern information of the preceding TSN node.

Note: During the 5G virtual bridge registration stage, the 5GS may indicate the needs of the traffic pattern for both the current bridge and the preceding node. Then CNC may be configured to send both traffic patterns (e.g., both "TSN traffic pattern B" and "traffic pattern A" in FIG. 11) to the 5G bridge. However, the CNC behavior is out of scope of the present disclosure.

Step 2: The TSN AF forwards the additional TSN traffic pattern used by the preceding TSN node to the PCF (e.g., PCF 410), directly or via the NEF (e.g., NEF 500).

Step 3: The PCF finds suitable 5G QoS policies and rules that can fulfill the TSN QoS characteristics (i.e., maps the TSN QoS characteristics to 5G QoS profiles).

Step 4a: The SMF triggers the PDU session modification procedure to establish a new 5G QoS flow according to the selected QoS policies and rules. The SMF (e.g., SMF 408) configures the UE (e.g., UE 412), gNB (e.g., base station 302), and UPF (e.g., UPF 414) for QoS enforcement according to the existing 3GPP procedure (see TS 23.501 V15.8.0 clause 5.7). Every QoS flow has a QFI. Therefore, for every mapped TSN flow, the QFI can be used to identify the link between TSN traffic profile and QoS flow. An example mapping can be: QFI←→5G QoS profile←→TSN QoS characteristics←→TSN traffic pattern used by current node←→4 TSN traffic pattern used by preceding node.

Step 4b: In both uplink and downlink direction, the PCF distributes the additional TSN traffic pattern used by the preceding TSN node to the RAN (e.g., to the gNB) via the SMF and AMF (e.g., AMF 400). The additional TSN traffic pattern used by the preceding TSN node and associated QFI reference are sent from the SMF to the RAN via N2 information using the existing PDU session establishment/modification procedure. A new information element may be introduced in the N2 information to carry the additional TSN traffic pattern and QFI reference. The PDU session resources setup/modification procedure can be used to carry the additional TSN information from the AMF to the gNB, e.g. Next Generation Application Protocol (NGAP) over N2 (see 3GPP TS 38.413 V15.5.0). The QFI reference is used by the gNB to link the additional TSN traffic pattern to a specific TSN flow.

Step 5: The PCF responds to the TSN AF (directly or via the NEF).

Step 6: The TSN AF responds to the CNC.

Additional Aspects for Both First and Second Embodiments

Figure 14:
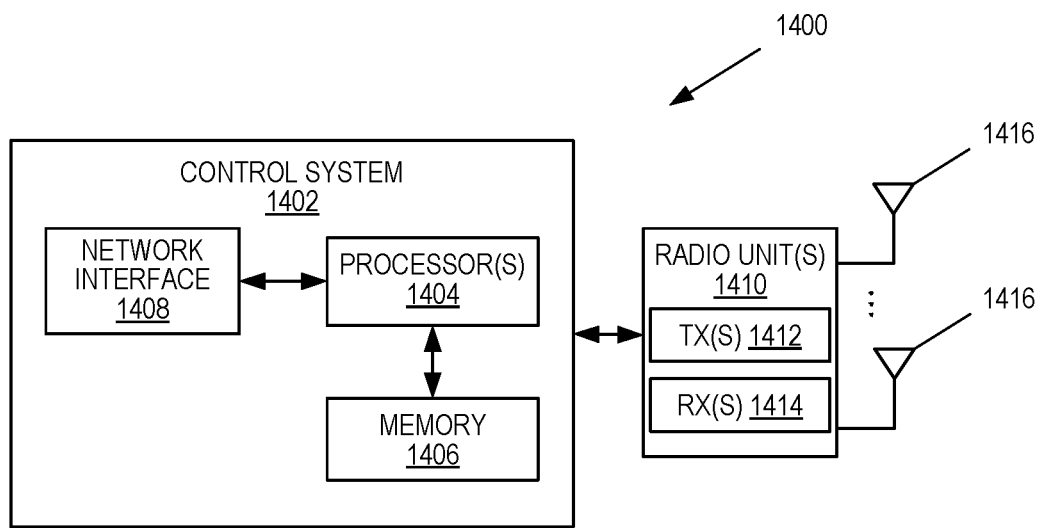
FIGS. 14 through 16 illustrate example embodiments of a network node, which in these particular examples is a radio access node.

FIG. 14 is a schematic block diagram of a radio access node 1400 according to some embodiments of the present disclosure. The radio access node 1400 may be, for example, a base station 302 or 306. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, the radio access node 1400 includes one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein. In some embodiments, the function(s) are implemented in software that is stored, e.g., in the memory 1406 and executed by the one or more processors 1404.

Figure 15:
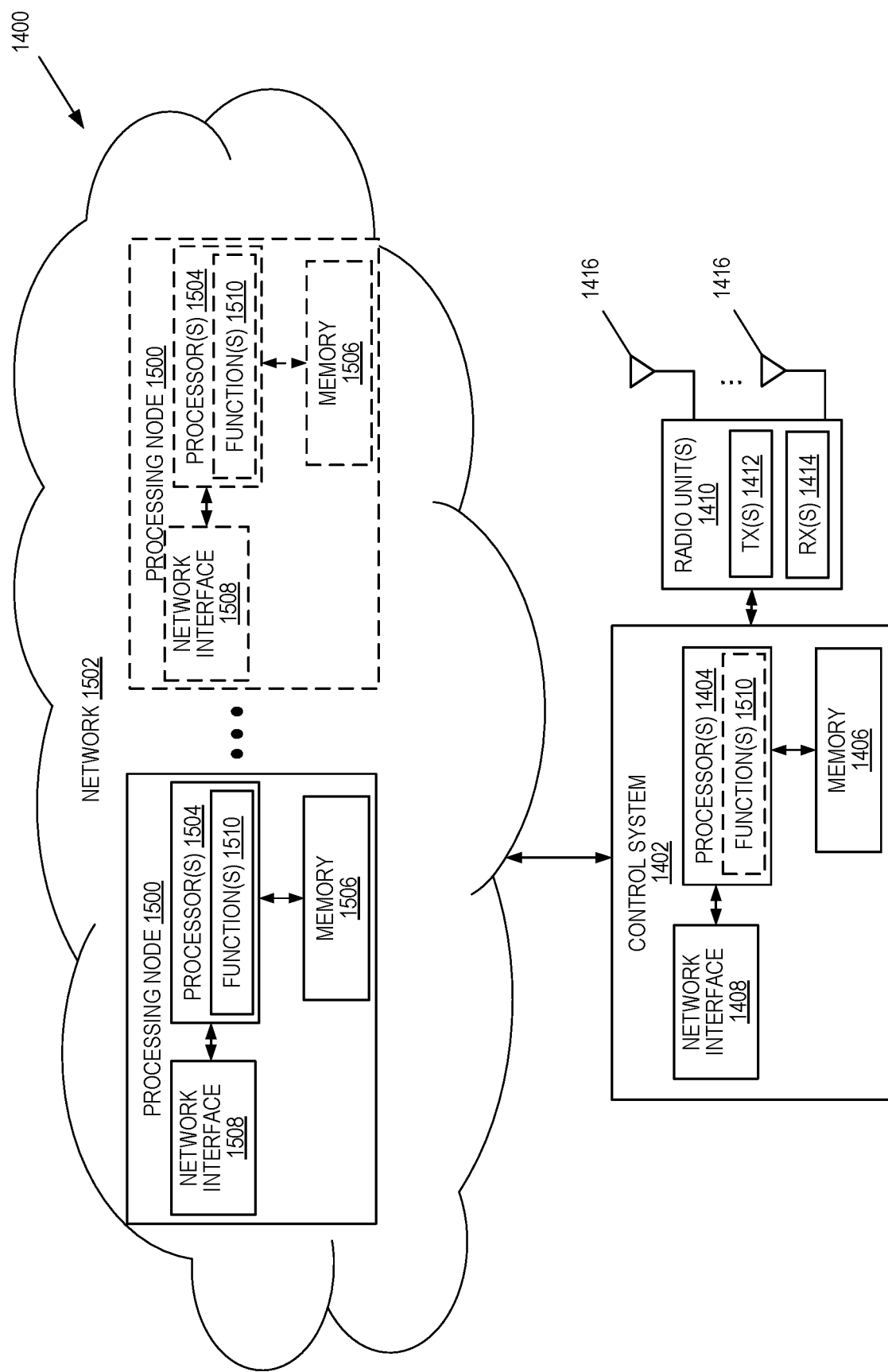

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node(s) in a network(s)). As illustrated, in this example, the radio access node 1400 includes the control system 1402 that includes the one or more processors 1404 (e.g., CPUs, ASICs, FPGAs, and/or the like), the memory 1406, and the network interface 1408 and the one or more radio units 1410 that each includes the one or more transmitters 1412 and the one or more receivers 1414 coupled to the one or more antennas 1416, as described above. The control system 1402 is connected to the radio unit(s) 1410 via, for example, an optical cable or the like. The control system 1402 is connected to one or more processing nodes 1500 coupled to or included as part of a network(s) 1502 via the network interface 1408. Each processing node 1500 includes one or more processors 1504 (e.g., CPUs, ASICs, FPGAs, and/or the like), memory 1506, and a network interface 1508.

In this example, functions 1510 of the radio access node 1400 described herein are implemented at the one or more processing nodes 1500 or distributed across the control system 1402 and the one or more processing nodes 1500 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
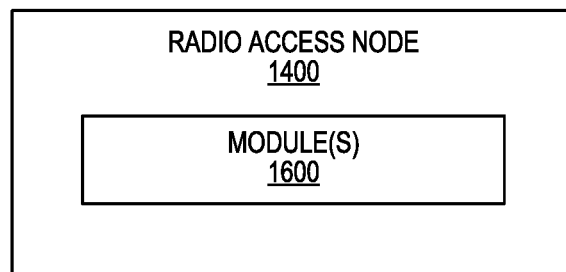

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein. This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
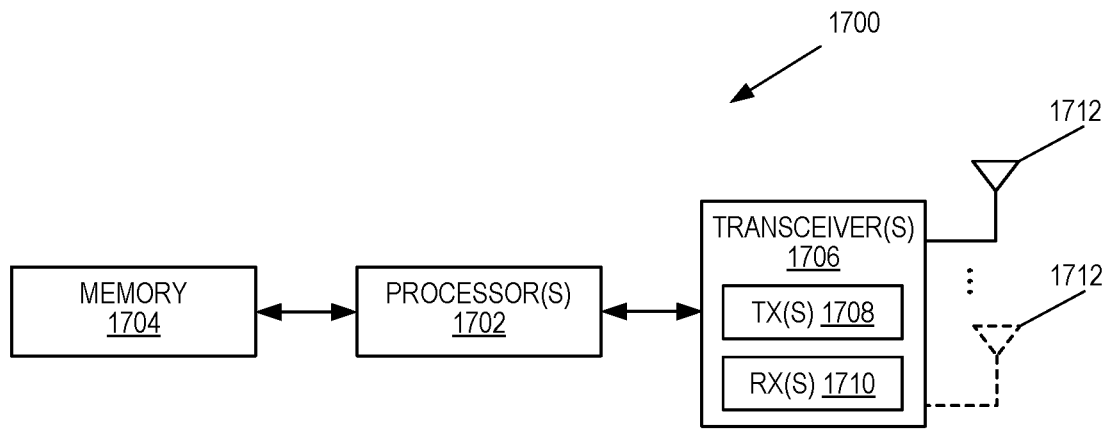
FIGS. 17 and 18 illustrate example embodiments of a User Equipment (UE).

FIG. 17 is a schematic block diagram of a UE 1700 according to some embodiments of the present disclosure. As illustrated, the UE 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the UE 1700 described above may be fully or partially implemented in software that is, e.g., stored in the memory 1704 and executed by the processor(s) 1702. Note that the UE 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the UE 1700 and/or allowing output of information from the UE 1700), a power supply (e.g., a battery and associated power circuitry), etc.

In some embodiments, a computer program including instructions which, when executed by at least one processor, causes the at least one processor to carry out the functionality of the UE 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
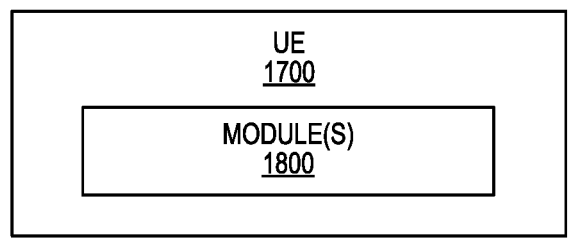

FIG. 18 is a schematic block diagram of the UE 1700 according to some other embodiments of the present disclosure. The UE 1700 includes one or more modules 1800, each of which is implemented in software. The module(s) 1800 provide the functionality of the UE 1700 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method of operation of a Time-Sensitive Networking, TSN, application function associated with a cellular communications system that operates as a virtual TSN node in a TSN, comprising: receiving, from a controller associated with the TSN, one or more TSN Quality of Service, QoS, parameters for the virtual TSN node and information related to a traffic pattern for the virtual TSN node; and providing, to a core network function in a core network of a Fifth Generation System, 5GS, the one or more TSN QoS parameters for the virtual TSN node and the information related to the traffic pattern for the virtual TSN node.

Embodiment 2: The method of embodiment 1 wherein the one or more TSN QoS parameters for the virtual TSN node comprise one or more QoS parameters for TSN traffic transmission.

Embodiment 3: The method of embodiment 2 wherein the one or more QoS parameters for TSN traffic transmission comprise latency of the virtual TSN node, bandwidth information, and/or priority level of TSN streams.

Embodiment 4: The method of any one of embodiments 1 to 3 wherein the information related to the traffic pattern for the virtual TSN node comprises gate control parameters for scheduled traffic.

Embodiment 5: The method of any one of embodiments 1 to 4 wherein the information related to the traffic pattern for the virtual TSN node comprises parameters that are not included in the cellular communications system model that are needed for the cellular communications system to fulfill TSN QoS requirements of TSN communications.

Embodiment 6: The method of any one of embodiments 1 to 5 wherein the core network function is a Policy Control Function, PCF.

Embodiment 7: The method of any one of embodiments 1 to 5 wherein the cellular communications system is a 5GS.

Embodiment 8: The method of embodiment 7 wherein the core network function is a Policy Control Function, PCF.

Embodiment 9: A method of operation of a core network function in a cellular communications system that operates as a virtual Time-Sensitive Networking, TSN, node in a TSN, comprising: receiving one or more TSN Quality of Service, QoS, parameters for the virtual TSN node and information related to a traffic pattern for the virtual TSN node; mapping the one or more TSN QoS parameters to one or more QoS policies in the cellular communications system and/or rules in the cellular communications system; applying the one or more QoS policies and/or the one or more rules in the cellular communications system; and providing (directly or indirectly) at least some of the information related to the traffic pattern for the virtual TSN node to another node in the cellular communications system.

Embodiment 10: The method of embodiment 9 wherein the one or more TSN QoS parameters for the virtual TSN node comprise one or more QoS parameters for TSN traffic transmission.

Embodiment 11: The method of embodiment 10 wherein the one or more QoS parameters for TSN traffic transmission comprise latency of the virtual TSN node, bandwidth information, and/or priority level of TSN streams.

Embodiment 12: The method of any one of embodiments 9 to 11 wherein the information related to the traffic pattern for the virtual TSN node comprises gate control parameters for scheduled traffic.

Embodiment 13: The method of any one of embodiments 9 to 12 wherein the information related to the traffic pattern for the virtual TSN node comprise parameters that are not included in the cellular communications system model that are needed for the cellular communications system to fulfill TSN QoS requirements of TSN communications.

Embodiment 14: The method of any one of embodiments 9 to 13 wherein applying the one or more QoS policies and/or the one or more rules in the cellular communications system comprises triggering a Protocol Data Unit, PDU, session modification procedure to establish a new QoS flow for TSN traffic according to one or more QoS policies and/or the one or more rules.

Embodiment 15: The method of any one of embodiments 9 to 14 wherein the cellular communications system is a Fifth Generation System, 5GS, and, for TSN traffic in an uplink direction, providing at least some of the information related to the traffic pattern for the virtual TSN node to another node in the cellular communications system comprises providing (directly or indirectly) at least some of the information related to the traffic pattern for the virtual TSN node to a User Plane Function, UPF, in a core network of the 5GS that operates as part of the virtual TSN node.

Embodiment 16: The method of any one of embodiments 9 to 14 wherein the cellular communication system is a Fifth Generation System, 5GS, and, for TSN traffic in a downlink direction, providing at least some of the information related to the traffic pattern for the virtual TSN node to another node in the cellular communications system comprises providing (directly or indirectly) at least some of the information related to the traffic pattern for the virtual TSN node to a User Equipment, UE, that operates as part of the virtual TSN node.

Embodiment 17: The method of any one of embodiments 9 to 16 wherein the cellular communications system is a Fifth Generation System, 5GS.

Embodiment 18: The method of embodiment 17 wherein the core network function is a Policy Control Function, PCF.

Embodiment 19: A method of operation of a node in a cellular communications system that operates as a virtual Time-Sensitive Networking, TSN, node in a TSN, comprising: receiving information related to a traffic pattern for the virtual TSN node; and utilizing the information at the node to output TSN traffic in accordance with the traffic pattern for the virtual TSN node.

Embodiment 20: The method of embodiment 19 wherein the cellular communication system is a Fifth Generation System, 5GS, and, for TSN traffic in a downlink direction, the node is a User Equipment, UE, that operates as part of the virtual TSN node.

Embodiment 21: The method of embodiment 19 wherein the cellular communication system is a Fifth Generation System, 5GS, and, for TSN traffic in an uplink direction, the node is a User Plane Function, UPF, in a core network of the 5GS that operates as part of the virtual TSN node.

Embodiment 22: A method of operation of a Time-Sensitive Networking, TSN, application function associated with a cellular communications system that operates as a virtual TSN node in a TSN, comprising: receiving, from a controller associated with the TSN, information related to a traffic pattern for a preceding TSN node in the TSN, the preceding TSN node is a TSN node in the TSN that precedes the virtual TSN node in a direction of TSN traffic flow; and providing, to a core network function in a core network of the 5GS, the information related to the traffic pattern for the preceding TSN node.

Embodiment 23: The method of embodiment 22 wherein the information related to the traffic pattern for the preceding TSN node comprises periodicity and/or message size.

Embodiment 24: The method of embodiment 22 or 23 wherein the information related to the traffic pattern for the preceding TSN node comprises information on when periodic TSN data from the preceding TSN node is to arrive.

Embodiment 25: The method of any one of embodiments 22 to 24 wherein the core network function is a Policy Control Function, PCF.

Embodiment 26: The method of any one of embodiments 22 to 25 wherein the cellular communications system is a Fifth Generation System, 5GS.

Embodiment 27: The method of embodiment 26 wherein the core network function is a Policy Control Function, PCF.

Embodiment 28: The method of any one of embodiments 22 to 24 further comprising the method of any one of embodiments 1 to 8.

Embodiment 29: A method of operation of a core network function in a cellular communications system that operates as a virtual Time-Sensitive Networking, TSN, node in a TSN, comprising: receiving information related to a traffic pattern for a preceding TSN node in the TSN, the preceding TSN node is a TSN node in the TSN that precedes the virtual TSN node in a direction of TSN traffic flow; providing (directly or indirectly) at least some of the information related to the traffic pattern for the preceding TSN node one or more radio access nodes in the cellular communications system.

Embodiment 30: The method of embodiment 29 wherein the information related to the traffic pattern for the preceding TSN node comprises periodicity and/or message size.

Embodiment 31: The method of embodiment 29 or 30 wherein the information related to the traffic pattern for the preceding TSN node comprises information on when periodic TSN data from the preceding TSN node is to arrive.

Embodiment 32: The method of any one of embodiments 29 to 31 wherein the cellular communications system is a Fifth Generation System, 5GS.

Embodiment 33: The method of embodiment 32 wherein the core network function is a Policy Control Function, PCF.

Embodiment 34: The method of any one of embodiments 29 to 31 wherein the method further comprises the method of any one of embodiments 9 to 18.

Embodiment 35: A node for a cellular communications system that operates as a virtual Time-Sensitive Networking, TSN, node in a TSN, the node adapted to perform the method of any one of embodiments 1 to 34.

Embodiment 36: A node for a cellular communications system that operates as a virtual Time-Sensitive Networking, TSN, node in a TSN, the node comprising: processing circuitry operable to cause the node to perform the method of any one of embodiments 1 to 34.

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
5GS Fifth Generation System
AF Application Function
AMF Access and Mobility Function
AN Access Network
ASIC Application Specific Integrated Circuit
AUSF Authentication Server Function
CN Core Network
CNC Centralized Network Configuration
CP Control Plane
CPU Central Processing Unit
CUC Central User Configuration
DN Data Network
DSP Digital Signal Processor
eNB Enhanced or Evolved Node B
FPGA Field Programmable Gate Array
gNB New Radio Base Station
HSS Home Subscriber Server
IEEE Institute of Electrical and Electronics Engineers
IP Internet Protocol
LTE Long Term Evolution
MME Mobility Management Entity
ms Millisecond
MTC Machine Type Communication
NAS Non-Access Stratum
NEF Network Exposure Function
NF Network Function
NGAP Next Generation Application Protocol
NR New Radio
NRF Network Repository Function
NSSF Network Slice Selection Function
PCF Policy Control Function
PDU Protocol Data Unit
P-GW Packet Data Network Gateway
QFI Quality of Service Flow Identifier
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
SPS Semi-Persistent Scheduling
TR Technical Report
TS Technical Specification
TSN Time-Sensitive Networking
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

REFERENCES

[1] H. Kagermann, W. Wahlster, and J. Helbig, "Recommendations for implementing the strategic ini-tiative INDUSTRIE 4.0", Final report of the Industrie 4.0 working group, acatech—National Academy of Science and Engineering, Munich, April 2013

[2] 3GPP TR. 22.804, Study on Communication for Automation in Vertical domains (CAV)

What is claimed is:

1. A method performed for operating a cellular communications system as a virtual Time-Sensitive Networking, TSN, node in a TSN system, comprising:
at a TSN application function associated with the cellular communications system:
receiving, from a controller associated with the TSN system, one or more TSN Quality of Service, QoS, parameters for the virtual TSN node; and
providing, to a core network function in a core network of the cellular communications system, the one or more TSN QoS parameters for the virtual TSN node; and
at the core network function:
receiving the one or more TSN QoS parameters for the virtual TSN node;

mapping the one or more TSN QoS parameters to one or more QoS policies in the cellular communications system, one or more rules in the cellular communications system, or both one or more QoS policies in the cellular communications system and one or more rules in the cellular communications system; and applying the one or more QoS policies, the one or more rules, or both the one or more QoS policies and the one or more rules, in the cellular communications system;

at the TSN application function:

receiving, from the controller associated with the TSN system, information related to a traffic pattern for the virtual TSN node wherein the information related to the traffic pattern comprises periodicity; and providing, to the core network function in the core network of the cellular communications system, the information related to the traffic pattern for the virtual TSN node;

at the core network function:

receiving the one or more TSN QoS parameters for the virtual TSN node and the information related to the traffic pattern for the virtual TSN node; and providing, directly or indirectly, at least some of the information related to the traffic pattern for the virtual TSN node to another node in the cellular communications system; and at the another node in the cellular communications system:

receiving, from the core network function, the at least some of the information related to the traffic pattern for the virtual TSN node; and forwarding the at least some of the information to an associated traffic translator such that the associated traffic translator outputs TSN traffic in accordance with the traffic pattern for the virtual TSN node.

2. The method of claim 1 wherein the one or more TSN QoS parameters for the virtual TSN node comprise one or more QoS parameters for TSN traffic transmission.

3. The method of claim 2 wherein the one or more QoS parameters for TSN traffic transmission comprise: (a) a latency of the virtual TSN node, (b) bandwidth information, (c) priority level of one or more TSN streams to be communicated via the virtual TSN node, or any combination of two or more of (a)-(c).

4. The method of claim 1 wherein the information related to the traffic pattern for the virtual TSN node comprises gate control parameters for scheduled traffic.

5. The method of claim 1 wherein the information related to the traffic pattern for the virtual TSN node comprises parameters that are not included in a model of the cellular communications system that are needed for the cellular communications system to fulfill TSN QoS requirements of TSN communications.

6. The method of claim 1 wherein:

the cellular communications system is a Fifth Generation System, 5GS, and for TSN traffic in an uplink direction, in order to provide the at least some of the information related to the traffic pattern for the virtual TSN node to another node in the cellular communications system execution of the instructions by the processing circuitry further causes the network node to provide, directly or indirectly, the at least some of the information related to the traffic pattern for the virtual TSN node to a User Plane Function, UPF, in a core network of the 5GS that operates as part of the virtual TSN node.

7. The method of claim 1 wherein:

the cellular communication system is a Fifth Generation System, 5GS, and for TSN traffic in a downlink direction, in order to provide the at least some of the information related to the traffic pattern for the virtual TSN node to another node in the cellular communications system execution of the instructions by the processing circuitry further causes the network node to provide, directly or indirectly, the at least some of the information related to the traffic pattern for the virtual TSN node to a User Equipment, UE, that operates as part of the virtual TSN node.

8. The method of claim 1 wherein, in order to apply the one or more QoS policies, the one or more rules, or both the one or more QoS policies and the one or more rules, in the cellular communications system, execution of the instructions by the processing circuitry further causes the network node to trigger a Packet Data Unit, PDU, session modification procedure to establish a new QoS flow for TSN traffic according to the one or more QoS policies, the one or more rules, or both the one or more QoS policies and the one or more rules.

9. The method of claim 1 wherein the cellular communications system is a 5GS.

10. The method of claim 6 wherein the core network function is a Policy Control Function, PCF.

* * * * *